(12) United States Patent
Yang et al.

(10) Patent No.: US 10,296,805 B2
(45) Date of Patent: May 21, 2019

(54) MARKER, METHOD OF DETECTING POSITION AND POSE OF MARKER, AND COMPUTER PROGRAM

(71) Applicant: SEIKO EPSON CORPORATION, Tokyo (JP)

(72) Inventors: Yang Yang, Toronto (CA); Guoyi Fu, Vaughan (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/208,015

(22) Filed: Dec. 3, 2018

(65) Prior Publication Data
US 2019/0102647 A1 Apr. 4, 2019

Related U.S. Application Data

(63) Continuation of application No. 15/159,327, filed on May 19, 2016.

(30) Foreign Application Priority Data

Jun. 22, 2015 (JP) .................................. 2015-124618
May 12, 2016 (JP) .................................. 2016-095734

(51) Int. Cl.
| | |
|---|---|
| G06K 9/32 | (2006.01) |
| G06K 9/46 | (2006.01) |
| G06T 7/73 | (2017.01) |
| G02B 27/01 | (2006.01) |
| G06T 19/00 | (2011.01) |

(52) U.S. Cl.
CPC ......... *G06K 9/4638* (2013.01); *G02B 27/017* (2013.01); *G06K 9/3216* (2013.01);
(Continued)

(58) Field of Classification Search
None
See application file for complete search history.

(56) References Cited

U.S. PATENT DOCUMENTS

| | | |
|---|---|---|
| 6,335,722 B1 | 1/2002 | Tani et al. |
| 9,317,973 B2 | 4/2016 | Choukroun |

(Continued)

FOREIGN PATENT DOCUMENTS

| | | |
|---|---|---|
| EP | 1852821 A1 | 11/2007 |
| EP | 2341386 A1 | 7/2011 |

(Continued)

OTHER PUBLICATIONS

Kato, Hirokazu et al., "Marker Tracking and HMD Calibration for a Video-Based Augmented Reality Conferencing System", Augmented Reality, (1999), Proceedings of the Second IEEE and ACM International Workshop on San Francisco, California, pp. 85-94.

(Continued)

*Primary Examiner* — Manav Seth
*Assistant Examiner* — David Perlman
(74) *Attorney, Agent, or Firm* — Oliff PLC

(57) ABSTRACT

A marker whose at least one of a position and pose with respect to a capturing unit is estimated includes: quadrilateral specifying points that specify a quadrilateral shape; a first circle group that is a group of a plurality of circles whose centers are present in a line of a first diagonal which is one of two diagonals of the specified quadrilateral shape, and which are included in the quadrilateral shape; a second circle group that is a group of a plurality of circles whose centers are present in a line of a second diagonal which is the other diagonal of the two diagonals than the first diagonal, and which are included in the quadrilateral shape; and a direction-identification point that specifies a direction of the quadrilateral shape.

14 Claims, 13 Drawing Sheets

(52) U.S. Cl.
CPC .............. *G06K 9/4604* (2013.01); *G06T 7/73* (2017.01); *G06T 19/006* (2013.01); *G02B 2027/014* (2013.01); *G02B 2027/0138* (2013.01); *G06K 2009/3225* (2013.01); *G06T 2207/30204* (2013.01)

(56) References Cited

U.S. PATENT DOCUMENTS

| | | |
|---|---|---|
| 2002/0052709 A1 | 5/2002 | Akatsuka et al. |
| 2002/0105484 A1 | 8/2002 | Navab et al. |
| 2002/0113756 A1 | 8/2002 | Tuceryan et al. |
| 2002/0180759 A1 | 12/2002 | Park et al. |
| 2003/0080978 A1 | 5/2003 | Navab et al. |
| 2008/0292131 A1 | 11/2008 | Takemoto et al. |
| 2008/0317333 A1 | 12/2008 | Li et al. |
| 2010/0182426 A1 | 7/2010 | Perruchot et al. |
| 2011/0194029 A1 | 8/2011 | Herrmann et al. |
| 2011/0248904 A1 | 10/2011 | Miyawaki et al. |
| 2012/0062691 A1 | 3/2012 | Fowler et al. |
| 2012/0212398 A1 | 8/2012 | Border et al. |
| 2012/0257024 A1 | 10/2012 | Inaba |
| 2012/0313955 A1 | 12/2012 | Choukroun |
| 2013/0050065 A1 | 2/2013 | Shimizu |
| 2013/0050833 A1 | 2/2013 | Lewis et al. |
| 2013/0106694 A1 | 5/2013 | Tanaka et al. |
| 2013/0162675 A1 | 6/2013 | Matsushima et al. |
| 2013/0187943 A1 | 7/2013 | Bohn et al. |
| 2013/0230209 A1 | 9/2013 | Hashimoto et al. |
| 2013/0235169 A1 | 9/2013 | Kato et al. |
| 2013/0241805 A1 | 9/2013 | Gomez |
| 2013/0335575 A1 | 12/2013 | Tsin et al. |
| 2014/0071308 A1 | 3/2014 | Cieplinski et al. |
| 2014/0160320 A1 | 6/2014 | Babale et al. |
| 2014/0327792 A1 | 11/2014 | Mulloni et al. |
| 2014/0333665 A1 | 11/2014 | Sylvan et al. |
| 2015/0009313 A1 | 1/2015 | Noda et al. |
| 2015/0025683 A1 | 1/2015 | Amano |
| 2015/0109335 A1 | 4/2015 | Hayakawa et al. |
| 2015/0169085 A1 | 6/2015 | Ida et al. |
| 2015/0213648 A1 | 7/2015 | Wu et al. |
| 2015/0220143 A1 | 8/2015 | Choi et al. |
| 2015/0228122 A1 | 8/2015 | Sadasue |
| 2015/0293362 A1 | 10/2015 | Takahashi et al. |
| 2016/0139413 A1 | 5/2016 | Gribetz et al. |
| 2016/0203581 A1 | 7/2016 | Keller et al. |
| 2016/0247322 A1 | 8/2016 | Komaki |
| 2016/0262608 A1 | 9/2016 | Krueger |
| 2016/0269685 A1 | 9/2016 | Jessop et al. |
| 2016/0295208 A1 | 10/2016 | Beall |
| 2016/0323569 A1 | 11/2016 | Wang |
| 2016/0349510 A1 | 12/2016 | Miller et al. |
| 2017/0041592 A1 | 2/2017 | Hwang et al. |
| 2017/0054970 A1 | 2/2017 | Singh et al. |
| 2017/0085770 A1 | 3/2017 | Cui et al. |
| 2017/0213085 A1 | 7/2017 | Fu et al. |
| 2017/0278262 A1 | 9/2017 | Kawamoto et al. |
| 2018/0007350 A1 | 1/2018 | Liu et al. |

FOREIGN PATENT DOCUMENTS

| | | |
|---|---|---|
| JP | H06-137840 A | 5/1994 |
| JP | 2005-038321 A | 2/2005 |
| WO | 99/23524 A1 | 5/1999 |
| WO | 2004-113991 A2 | 12/2004 |

OTHER PUBLICATIONS

Garrido-Jurado, S. et al., "Automatic Generation and Detection of Highly Reliable Fiducial Markers Under Occlusion", Pattern Recognition, vol. 47, (2014), pp. 2280-2292.

Oct. 19, 2016 Extended Search Report issued in European Patent Application No. 16175559.0.
May 4, 2017 Office Action issued in U.S. Appl. No. 14/740,523.
McGarrity, Erin et al., "A Method for Calibrating See-Through Head-Mounted Displays for AR" Augmented Reality, 1999. (IWAR'99) Proceedings. 2nd IEEE and ACM International Workshop on. IEEE, 1999.
Zhang, Xiang et al.; "Visual Marker Detection and Decoding in AR Systems: A Comparative Study", Augments Reality Group; Siemens Corporation Research; Princeton, NJ, (2002), pp. 1-10.
Sep. 14, 2017 Office Action issued in U.S. Appl. No. 14/740,523.
Billinghurst, Mark. et al., "Collaborative Mixed Reality", Proceedings of International Symposium on Mix Reality, (Jan. 1, 1993), pp. 261-284.
Owen, Charls B. et al., "Display-Relative Calibration for Optical See-Through Head-Mounted Displays", Proceedings of the "Third IEEE and ACM International Symposium on Mixed and Augmented Reality", (Nov. 2-5, 2004), Arlington VA, USA, IEEE Piscataway, NJ, USA, pp. 70-78.
Genc, Yakup et. al, "Practical Solutions for Calibration of Optical See-Through Devices", Proceedings of International Symposium on Mixed and Augmented Reality, ISMAR 2002, (Sep. 30-Oct. 1, 2002), Drmstadt, Germany, IEEE Computer Society, Los Alamitos, pp. 169-275.
Gottschalk, Stefan. et al., "Autocalibration for Virtual Environments Tracking Hardware", Proceedings of SIGGRAPH 93, Computer Graphics Proceedings, Anuucal Conference Series, pp. 65-72, (1993).
Malek S. el al., "Calibration Method for an Augmented Reality System", World Academy of Science, Engineering and Technology 21, (2008).
Tuceryan, Mihran et. al., "Calibration Requirements and Procedures for a Monitor-Based Augmented Reality System", IEEE Transactions on Visualization and Computer Graphics, vol. 1, No. 3, pp. 255-273, (1995).
Sep. 12, 2016 Office Action issued in U.S. Appl. No. 14/740,523.
Zhang, Xiang et al., "Visual Marker Detection and Decoding in AR Systems: A Comparative Study," Proceedings of the International Symposium on Mixed and Augmented Reality, Sep. 30, 2002, pp. 97-106.
You, Suya et al., "Hybrid Inertial and Vision Tracking for Augmented Reality Registration," Virtual Reality, (1999), Proceedings of IEEE Houston, Texas, Mar. 13, 1999, pp. 260-267.
Fuhrmann Anton et al., "Fast Calibration for Augmented Reality", Vienna University of Technology.
Apr. 21, 2017 Office Action issued in U.S. Appl. No. 15/187,257.
Aug. 17, 2017 Office Action issued in U.S. Appl. No. 15/187,257.
Kato et al. Marker Tracking and HMD Calibration for a Video-based Augmented Reality Conferencing System., Dec. 1999, 1-10.
U.S. Appl. No. 15/159,327, filed May 19, 2016 in the name of Yang et al.
U.S. Appl. No. 15/187,257, filed Jun. 20, 2016 in the name of Li et al.
Jan. 25, 2018 Office Action issued in U.S. Appl. No. 15/187,257.
Feb. 14, 2018 Office Action issued in U.S. Appl. No. 15/346,112.
Feb. 14, 2018 Office Action issued in U.S. Appl. No. 15/346,261.
Naimark Leonid et al. "Circular Data Matrix Fiducial System and Robust Image Processing for a Wearable Vision-Inertial Self-Tracker". Proceedings of the International Symposium on Mixed and Augmented Reality (ISMAR'02), pp. 1-10, Dec. 2002.
Feb. 27, 2018 Office Action issued in U.S. Appl. No. 15/159,327.
U.S. Appl. No. 14/740,523, filed Jun. 16, 2015 in the name of Kezele et al.
U.S. Appl. No. 15/346,112, filed Nov. 8, 2016 in the name of Li et al.
U.S. Appl. No. 15/346,261, filed Nov. 8, 2016 in the name of Fu et al.
Apr. 19, 2018 Office Action issued in U.S. Appl. No. 14/740,523.
Aug. 10, 2018 Office Action issued in U.S. Appl. No. 15/346,112.
Aug. 13, 2018 Office Action issued in U.S. Appl. No. 15/346,261.

MARKER, METHOD OF DETECTING POSITION AND POSE OF MARKER, AND COMPUTER PROGRAM

RELATED APPLICATIONS

This application is a continuation of U.S. patent application Ser. No. 15/159,327, filed May 19, 2016, which in turn claims priority to Japanese Patent Application No. 2015-124618, filed Jun. 22, 2015, and to Japanese Patent Application No. 2016-095734, filed May 12, 2016. The disclosures of these prior applications are incorporated by reference herein in their entirety.

BACKGROUND

1. Technical Field

The present invention relates to a technology of detecting a marker, preferably a technology of detecting a position and pose of a marker.

2. Related Art

In a method of detecting a marker of the related art, a position and pose of a marker with respect to a capturing unit that captures the marker are specified by capturing the marker having a known quadrilateral shape in advance and specifying elements as edges such as four sides of the captured marker.

SUMMARY

In the method of detecting the marker of the related art, when an object which is not the target marker but has the same external shape as the marker is captured, there is a concern that misdetection is performed.

Also, there is a demand for further improving the accuracy of the position and pose of the specified marker.

An advantage of some aspects of the invention is to solve at least a part of the problems described above, and the invention can be implemented as the following aspects.

(1) An aspect of the invention provides a marker. The marker includes: quadrilateral specifying points that specify a quadrilateral shape; a first circle group including a plurality of first circles, centers of the first circles being within the quadrilateral shape and present in a line of a first diagonal which is one of two diagonals of the specified quadrilateral shape; a second circle group including a plurality of second circles, centers of the second circles being within the quadrilateral shape and present in a line of a second diagonal which is the other diagonal of the two diagonals than the first diagonal; and a direction-identification point. According to the marker of the aspect, when the marker is captured, since the marker is recognized using the plurality of circles included in the first circle group and the second circle group and the direction identification point in addition to the quadrilateral specifying points, the marker is more easily detected. Thus, for example, the calibration for superimposing the display image on the external scenery captured by the capturing unit is more accurately performed by capturing the marker.

(2) According to another aspect of the invention, the marker further includes: a central circle having a center at the intersection of two diagonals. According to the marker of this aspect, since the central circle is included, when the marker is captured, the reference point is accurately identified by identifying the center of the central circle as a reference point, and thus, the marker is more accurately identified.

(3) According to another aspect of the invention, the central circle is included in the first circle group and in the second circle group. According to the marker of this aspect, since the central circle is included in both the first circle group and the second circle group, when the marker is captured, the marker is more accurately identified, unlike the case where the central circle is included in one of the first and second circle groups.

(4) According to another aspect of the invention, the direction-identification point is different from the intersection of two diagonals, and is a central point of a direction-identification circle within the quadrilateral shape. According to the marker of this aspect, since the direction identification point different from the center of the central circle is used as a point for identifying the direction of the marker, the direction of the captured marker is simply identified.

(5) According to another aspect of the invention, the direction-identification circle is different from a central circle having a center at the intersection of two diagonals, the direction-identification circle being included in the first circle group and in the second circle group. According to the marker of this aspect, since a center of a circle different from the central circle is used as the direction identification circle, the direction of the captured marker is more accurately identified.

(6) According to another aspect of the invention, the direction-identification circle is one circle. According to the marker of this aspect, since the direction of the marker is identified by one circle, the direction of the marker is simply identified.

(7) According to another aspect of the invention, the first circle group and the second circle group are formed so as to have at least one symmetry of line symmetry with respect to a straight line which passes through the center of the quadrilateral shape and is parallel to one side of the quadrilateral shape and point symmetry with respect to the intersection of two diagonals. According to the marker of this aspect, since the plurality of circles included in the marker is symmetrically formed, the marker is simply extracted from the captured image.

(8) According to another aspect of the invention, sizes of the circles within the quadrilateral shape are all the same. According to the marker of this aspect, since the plurality of circles has the same size, the circles of the captured image and other shapes are accurately distinguished from each other, and thus, it is easy to simply extract the marker from the captured image.

(9) According to another aspect of the invention, the circles within the quadrilateral shape have in common a white color or a black color, and the quadrilateral specifying points are four vertices at which outer frames of the quadrilateral shape cross each other, and portions other than the circles within the quadrilateral shape have in common a white color or a black color different from the color of the circles. According to the marker of this aspect, since the plurality of circles within the marker and other portions are accurately distinguished from each other, it is easy to identify the marker.

(10) According to another aspect of the invention, the first circle group is formed by the first circles, the first circles being arranged with an intersection of the two diagonals as a center of the first circle group, each distance between adjacent centers of the first circles having the same first distance among the first circles, each first circle having the same first size among the first circles, and the second circle group is formed by the second circles, the second circles being arranged with the intersection of the two diagonals as a center of the second circle group, each distance between adjacent centers of the second circles being the same as the first distance, each second circle having the same size as the first size. According to the marker of this aspect, since the plurality of circles within the marker and other portions are distinguished from each other by one pattern, it is easy to simply extract the marker from the captured image.

(11) Still another aspect of the invention provides a method of detecting a marker. The method includes: capturing an external scenery; extracting the marker from an image of the captured external scenery; identifying a direction-identification point that identifies a direction of the extracted marker; identifying a plurality of identification points that identify the marker, other than the direction-identification point from the extracted marker; and calculating the position and pose of the marker with respect to the capturing unit based on the identified direction-identification point of the marker and the plurality of identified identification points.

(12) According to another aspect of the invention, in the extracting of the marker, the identifying of the direction-identification point, and the identifying of the plurality of identification points, binarization is performed on the image of the captured external scenery by using an adaptive thresholding approach or method. According to the method of this aspect, since the binarization is performed by using an adaptive thresholding approach or method, when the marker is included in the image of the external scenery, it is easy to more accurately extract the marker.

(13) According to another aspect of the invention, the direction-identification point and the plurality of identification points are identified using the centers of the circles. According to the method of this aspect, in order to identify one point as the identification point included in the image of the captured external scenery, since the identification point is identified using a plurality of measurement points of a contour of a circle having the identification point as a center, it is possible to more accurately identify the identification point.

(14) Still another aspect of the invention provides a computer program that causes a computer capable of communicating with a device including a capturing unit to detect a marker. The computer program causes the computer to realize functions of: (A) capturing an external scenery; (B) extracting the marker from an image of the captured external scenery; (C) identifying a direction-identification point that identifies a direction of the extracted marker; (D) identifying a plurality of identification points for identifying the marker other than the direction-identification point from the marker; and (E) calculating the position and pose of the marker with respect to the capturing unit based at least on the identified direction-identification point and the plurality of identified identification points. According to the marker of this aspect, when the marker is captured, since the marker is recognized using the plurality of identification elements included in the first identification element group and the second identification element group and the direction identification element in addition to the quadrilateral specifying elements, the position and pose of the marker is more accurately identified.

(15) According to another aspect of the invention, the device further includes an inertial sensor. The computer program causes the computer to realize functions of: (F) further capturing the marker with the capturing unit, (G) calculating a position and pose of the inertial sensor using a sensor fusion algorithm based on output from the capturing unit obtained through the function (F) and output from the inertial sensor, (H) calculating a position and pose of the marker based at least on the position and pose of the marker calculated through the function (E) and the position and pose of the inertial sensor calculated through the function (G).

Still another aspect of the invention provides a marker. The marker includes: quadrilateral specifying elements that specify a quadrilateral shape; a first identification element group including a plurality of first identification elements, the plurality of first identification elements being within the quadrilateral shape and present in a line of a first diagonal which is one of two diagonals of the specified quadrilateral shape; a second identification element group including a plurality of second identification elements, the plurality of second identification elements being within the quadrilateral shape present in a line of a second diagonal which is the other diagonal of the two diagonals than the first diagonal; and a direction-identification element.

All the plurality of components included in the respective aspects described above is not essential, but a part of the plurality of components may be appropriately changed, removed, and substituted with a new component in order to solve a part or all of the aforementioned problems or in order to achieve a part or all of the aforementioned advantages. A part of the limitation content may be removed. In order to solve a part or all of the aforementioned problems, or in order to achieve a part or all of the advantages described in the present specifications, a part or all of the technical features included in the aspect of the invention may be combined with a part or all of the technical features included in another aspect of the invention, and the combination may be used as an independent aspect of the invention.

For example, the aspect of the invention can be implemented as the marker that includes a part or all of four elements of the quadrilateral specifying points, the first circle group, the second circle group, and the direction identification point. That is, the marker does not necessarily have the quadrilateral specifying points. The marker does not necessarily have the first circle group. The marker does not necessarily have the second circle group. The marker does not necessarily have the direction identification point. The quadrilateral specifying points may specify, for example, the quadrilateral shape. For example, the first circle group may have the center present in the line of the first diagonal which is one of the two diagonals of the quadrilateral shape, and may be the group of the plurality of circles included in the quadrilateral shape. For example, the second circle group has the center present in the line of the second diagonal different from the first diagonal of the two diagonals, and may be the group of the plurality of circles included in the quadrilateral shape. For example, the direction identification point may identify the direction of the quadrilateral shape. The marker may be implemented as an object other than the marker. According to the aspect, it is possible to solve at least one of various problems such as the simplification of the marker, the integration of the marker, or the improvement of the convenience when the marker is used. A part of all of the technical features of the respective embodiments of the aforementioned marker may be applied to the device.

The invention can be implemented in various forms other than the marker. For example, the invention can be implemented as a device including a marker, a method of detecting a position and pose of a marker, a detection device capable of detecting a position and pose of a marker, a computer program for causing a computer to execute the detection of a position and pose of a marker, a recording medium that records the computer program, and a form such as a data signal which includes the computer program and is implemented within a carrier waver.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiment

A-1. Configuration of Marker

Figure 1:
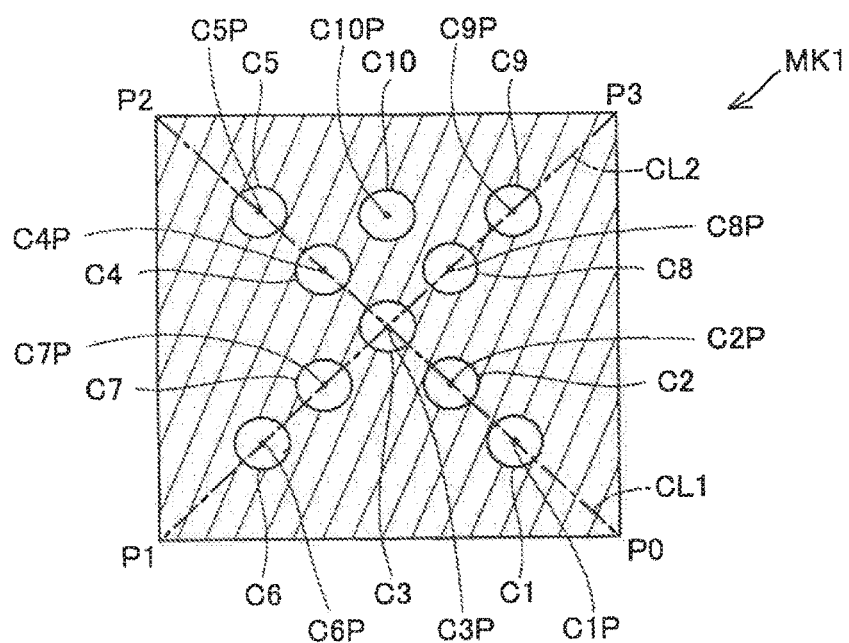
FIG. 1 is an explanatory diagram of a marker used to perform calibration of the present embodiment.

FIG. 1 is an explanatory diagram of a marker MK 1 used to perform calibration according to the present embodiment. In the related art, as a device for allowing a user to see an image, there has been known a head-mounted display (HMD) that allows the user to see an image displayed by an image display unit and allows the user to see an external scenery transmitted through the image display unit by being worn on the head of the user. The HMD of the present embodiment may have a function of allowing the user to see a virtual object (display image) being overlaid on a corresponding predetermined real object existing at the external scenery with its perceived position and pose being aligned with those of the perceived real object. To achieve this function, an imaging unit and an image display unit included in the HMD are calibrated (this is referred to as factory calibration) according to an average head size (including an interocular distance). When an actual user uses the HMD, since there are an individual difference in the head size and a difference in how to wear the HMD, it is preferable that the factory calibration is customized according to such differences (this is referred to as calibration customization, or is simply referred to as calibration). Ideally, if a relative positional relationship between the real object and the imaging unit, camera parameters of the imaging unit, a relative positional relationship between the imaging unit and a display device, and projection parameters (rendering camera parameters) of an image display device are appropriately set in an image processing device within the HMD, the calibration customization may be accomplished merely, for instance, by adjusting vertically and/or horizontally the displayed virtual object (or an image area of the image display unit) on the display unit within the HMD by user who wears the HMD. However, it is preferable that when the calibration customization is performed, if the relative positional relationship between the real object and the imaging unit is unknown, the relative positional relationship between the real object and the imaging unit is estimated and tracked as well. In the present embodiment, the "relative positional relationship" is represented by at least one of the rotations (3 degrees of freedom) and the translations (3 degrees of freedom) between two objects (including the plane object) in three-dimensional space.

The marker MK1 shown in FIG. 1 is a marker used to obtain the relative positional relationship between the imaging unit and the marker MK1 as the real object when the calibration of the HMD is performed. The detailed description of the HMD will be described later.

FIG. 1 shows the marker MK1 having a quadrilateral shape formed by connecting vertices P0, P1, P2, and P3 which are four vertices with straight lines in a planar shape, and a peripheral region surrounding the quadrilateral shape. The marker MK1 of the present embodiment has a square shape, but may have a different quadrilateral shape (for example, rectangular shape) in another embodiment. The marker MK1 is a marker having a plurality of substantially perfect circles formed in white within the square shape filled in black, the square shape being surrounded by a non-black, for example white, peripheral region. The black and white in the marker MK1 including the peripheral region may be reversed according to another embodiment. In FIG. 1, a portion filled in black is represented by a hatched portion with oblique lines. In the marker MK1 of the present embodiment, the plurality of circles included in the square shape has the same size. The four vertices of the present embodiment correspond to quadrilateral specifying points in the appended claims.

The plurality of circles included in the marker MK1 is classified into a first circle group CG1, a second circle group CG2, and a direction-identification circle C10. The first circle group CG1 includes five circles C1, C2, C3, C4 and C5 each having the center of the circle present in a diagonal CL1 that connects the vertex P0 and the vertex P2 which is not adjacent to the vertex P0. The second circle group CG2 includes five circles C6, C7, C3, C8, and C9 each having the center of the circle present in a diagonal CL2 that connects the vertex P1 and the vertex P3 which is not adjacent to the vertex P1. The circle C3 having the intersection of the diagonal CL1 and the diagonal CL2 as a center of the circle C3P is included in both the first circle group CG1 and the second circle group CG2. In other words, the circle C3 is a circle having the intersection of two diagonals CL1 and CL2 as its center. The circle C3 corresponds to a central circle in the appended claims. The direction-identification circle C10 is a circle having a center C10P overlapping neither the diagonal CL1 nor the diagonal CL2. Hereinafter, a symbol in which "p" is assigned to the end of the symbol representing the name of the circle is called the center of the corresponding circle (for example, the center COP of the circle C0).

The circles constituting the first circle group CG1 are formed such that distances between the centers of the adjacent circles are equal to one another. For this reason, the black portions existing between the adjacent circles of the first circle group CG1 have the same area. Similarly, the circles constituting the second circle group CG2 are formed such that distances between the centers of the adjacent circles are equal to one another. For this reason, similarly to the first circle group CG1, the black portions existing between the adjacent circles in the second circle group CG2 have the same area. In the present embodiment, the distances between the centers of the adjacent circles of the first circle group CG1 are the same as the distances between the centers of the adjacent circles of the second circle group CG2. Through the above relationships, the first circle group CG1 and the second circle group CG2 are formed so as to have point symmetry with respect to the center C3P of the circle C3 as their centers. The first circle group CG1 and the second circle group CG2 are formed so as to have line symmetry with respect to a straight line which passes through the center C3P of the circle C3 and is parallel to any one of four sides.

The direction-identification circle C10 is formed in one isosceles right triangle of four isosceles right triangles obtained by dividing the square shape as the marker MK1 by the diagonals CL1 and CL2. More specifically, the direction-identification circle C10 is included in the isosceles right triangle formed by the vertex P2, the vertex P3 and the center C3P which is the intersection of the diagonal CL1 and the diagonal CL2. The center C10P of the direction-identification circle C10 is a midpoint of a straight line that connects the center C5P of the circle C5 which is included in the first circle group CG1 and is closest to the vertex P2 and a center C9P of the circle C9 which is included in the second circle group CG2 and is closest to the vertex P3. For this reason, the first circle group CG1 and the second circle group CG2 are formed so as to have line symmetry with respect to a straight line passing through the center C3P of the circle C3 and the center C10P of the direction-identification circle C10. When the direction-identification circle C10 is added to the circles within the marker MK, the direction-identification circle C10 is positioned such that the point symmetry with respect to the center C3P is broken as a whole. The center C10P of the direction-identification circle C10 of the present embodiment corresponds to a direction-identification point in the appended claims. The identification points that are determined based on the circle centers in the present embodiment are examples of an identification element described in the summary.

A-2. Configuration of Head-Mounted Display (HMD)

Figure 2:
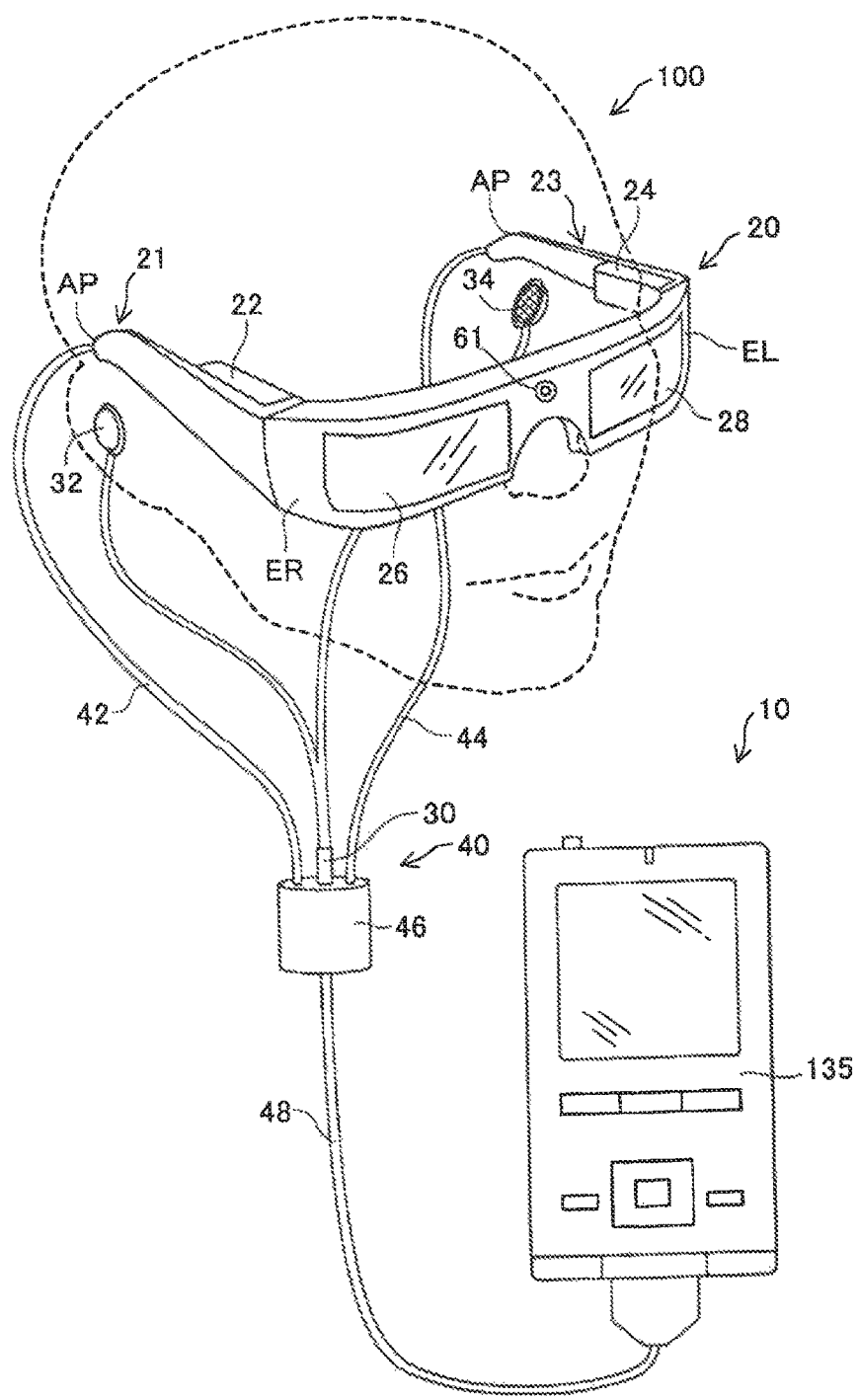
FIG. 2 is an explanatory diagram showing the configuration of an external appearance of a head-mounted display (HMD) that performs the calibration.

FIG. 2 is an explanatory diagram showing the configuration of an external appearance of a head-mounted display 100 (HMD 100) that performs calibration. The HMD 100 may allow a user to see a display image displayed by an image display unit 20, and may allow the user to see an external scenery transmitted through the image display unit 20. Thus, the HMD 100 is an optical see-through type display device. The HMD 100 includes the image display unit 20 that displays an image, and a control unit 10 (controller 10) that controls the image display unit 20.

The image display unit 20 is a wearing unit worn on the head of the user, and is a glasses type. The image display unit 20 includes a right holding section 21, a right display driving section 22, a left holding section 23, a left display driving section 24, a right optical image display section 26, a left optical image display section 28, and a camera 61. The right optical image display section 26 and the left optical image display section 28 are arranged so as to be respectively positioned in front of the right and left eyes of the user when the user wears the image display unit 20. One end of the right optical image display section 26 and one end of the left optical image display section 28 are connected to each other in positions corresponding to eyebrows of the user when the user wears the image display unit 20.

The right holding section 21 is a member that is provided to extend from an end ER which is the other end of the right optical image display section 26 to a position corresponding to a side of the head of the user when the user wears the image display unit 20. Similarly, the left holding section 23 is a member that is provided to extend from an end EL which the other end of the left optical image display section 28 to a position corresponding to the side of the head of the user when the user wears the image display unit 20. The right display driving section 22 and the left display driving section 24 are arranged on sides facing the head of the user when the user wears the image display unit 20.

The display driving sections 22 and 24 include liquid crystal displays 241 and 242 (hereinafter, referred to as LCDs 241 and 242) and projection optical systems 251 and 252, to be described in FIG. 3. The configurations of the display driving sections 22 and 24 will be described in detail below. The optical image display sections 26 and 28 include light guiding plates 261 and 262 (see FIG. 3) and a dimming plate, to be described below. The light guiding plates 261 and 262 are made of an optical transparent resin material, and guide image light rays output from the display driving sections 22 and 24 to the eyes of the user. The dimming plate is a thin plate-like optical element, and is disposed so as to surround a surface of the image display unit 20 which is a side opposite to the eyes of the user. It is possible to adjust the easiness in seeing a virtual image by adjusting the amount of external light rays incident on the eyes of the user due to the adjustment of the light transmittance of the diming plate.

The camera 61 is disposed in a position corresponding to a position between the eyebrows of the user when the user wears the image display unit 20. For this reason, the camera 61 captures the external scenery which an external scenery in a field-of-view direction of the user while the user wears the image display unit 20 on their head, and obtains a captured image acquired by capturing the external scenery.

The image display unit 20 further includes a connection section 40 for connecting the image display unit 20 to the control unit 10. The connection section 40 includes a main body cord 48 connected to the control unit 10, a right cord 42, a left cord 44, and a coupling member 46. The right cord 42 and the left cord 44 are cords formed by which the main cord 48 branches into two cords. The right cord 42 is inserted into a housing of the right holding section 21 from a front end AP of the right holding section 21 in an extension direction, and is connected to the right display driving section 22. Similarly, the left cord 44 is inserted into a housing the left holding section 23 from a front end AP of the left holding section 23, and is connected to the left display driving section 24. The coupling member 46 is provided at a branch point of the main cord 48 into the right cord 42 and the left cord 44, and includes a jack for connecting an earphone plug 30. A right earphone 32 and a left earphone 34 extend from the earphone plug 30. The image display section 20 and the control unit 10 transmit various signals through the connection section 40. For example, the right cord 42, the left cord 44 and the main body cord 48 may adopt a metal cable or an optical fiber.

The control unit 10 is a unit for controlling the HMD 100. The control unit 10 includes an operation unit 135 including a plurality of buttons capable of being pressed or an electrostatic trackpad.

Figure 3:
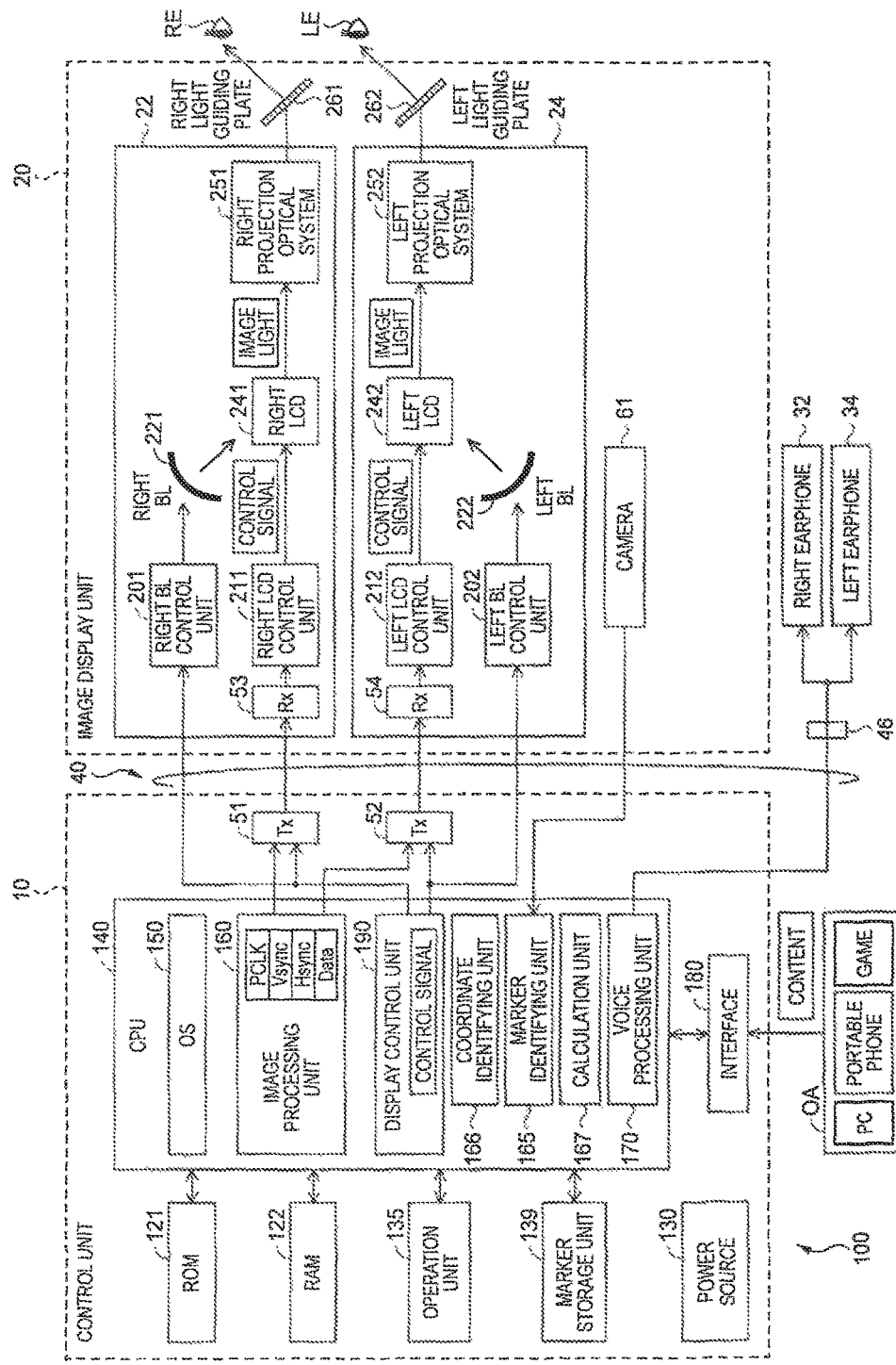
FIG. 3 is a block diagram that shows the functional configuration of the HMD.

FIG. 3 is a block diagram that functionally shows the configuration of the HMD 100. As shown in FIG. 3, the control unit 10 includes a ROM 121, a RAM 122, a power source 130, an operation unit 135, a marker storage unit 139, a CPU 140, an interface 180, a transmission unit 51 (Tx 51), and a transmission unit 52 (Tx 52).

The power source 130 supplies a power to the respective units of the HMD 100. Various computer programs are stored in the ROM 121. The CPU 140, to be described below, executes the various computer programs by developing the various computer programs stored in the ROM 121 in the RAM 122.

The marker storage unit 139 stores information regarding a marker, such as the marker MK1 shown in FIG. 1, which is recognized as a marker by the HMD 100. The marker storage unit 139 stores the information regarding the marker by representing identification points for identifying the marker as coordinate values of a model coordinate system. Hereinafter, the marker MK1 in the model coordinate system is referred to as a marker MK3. For example, the center C3P which is the intersection of the diagonal CL1 and the diagonal CL2 may be used as the origin of the model coordinate system. In this case, since the marker MK1 is the plane, Z coordinates of the identification points may be zero. For example, the marker storage unit 139 stores coordinate values of coordinates P0, P1, P2, and P3 of the four vertices for specifying the quadrilateral of the marker MK1, as coordinates of the model coordinate system. The marker storage unit 139 stores coordinate values of the centers of the plurality of circles included in the marker MK1 by using the center C3P as the origin as its reference. The marker storage unit 139 stores information as to how black and white areas arranged along two diagonals CL1 and CL2 extracted from the four specified vertices. The arrangement of the black and white areas will be described in detail below.

The CPU 140 functions as an operating system 150 (OS 150), a display control unit 190, a voice processing unit 170, an image processing unit 160, a marker identifying unit 165, a coordinate identifying unit 166, and a calculation unit 167 by developing the computer programs stored in the ROM 121 in the RAM 122.

The display control unit 190 generates control signals for controlling the right display driving section 22 and the left display driving section 24. The display control unit 190 controls the generation and emission of the image light rays performed by the right display driving section 22 and the left display driving section 24. The display control unit 190 transmits control signals to a right LCD control unit 211 and a left LCD control unit 212 through the transmission units 51 and 52, respectively. The display control unit 190 transmits control signals to a right backlight control unit 201 and a left backlight control unit 202, respectively.

The image processing unit 160 obtains an image signal in content, and transmits the obtained image signal to reception units 53 and 54 of the image display unit 20 through the transmission units 51 and 52. The voice processing unit 170 obtains a voice signal included in the content, amplifies the obtained voice signal, and supplies the amplified voice signal to a speaker (not shown) within the right earphone 32 and a speaker (not shown) within the left earphone 34 connected to the coupling member 46.

The marker identifying unit 165 performs binarization on the captured image obtained by the camera 61 by using a predetermined gradation value as a threshold. The marker identifying unit 165 determines to extract the marker MK1 stored in the marker storage unit 139 from the binarized image. The binarization determination will be described in detail below, but the marker identifying unit 165 first performs the binarization on the captured image by using a preset initial threshold in the present embodiment. When it is not able to extract the marker MK1 through the binarization using the initial threshold, the marker identifying unit 165 performs the binarization on the captured image by using a new threshold obtained by adding an addition amount which is a preset gradation value to the initial threshold, and determines to extract the marker MK1. As stated above, the marker identifying unit 165 determines to extract the marker MK1 from the captured image by performing the binarization using several gradation values as a threshold.

The coordinate identifying unit 166 identifies the identification points in the marker MK1 extracted from the captured image by the marker identifying unit 165. For example, the external shape of the captured square-shaped marker MK1 is different depending on an angle to be captured, and is extracted as a trapezoid shape in some cases. The coordinate identifying unit 166 identifies or detects the coordinate values of the centers (for example, the center C3P and the like of FIG. 1) of the plurality of circles or the vertices P0, P1, P2, and P3 in the image of the extracted marker MK1.

The calculation unit 167 obtains the relative positional relationship between the marker MK1 and the camera 61 based on the correspondence relationship between the identification points in the image of the marker MK1 identified or detected by the coordinate identifying unit 166 and the stored identification points of the model marker MK3 in the model coordinate system. By using the thus obtained relative positional relationship, the user may be allowed to perform the calibration with the marker MK1. In the present embodiment, the calibration may produce a correction value which represents the adjustment of the display image of the virtual object in the horizontal and vertical directions or the display area in the image display unit. In another embodiment, the calibration may produce a correction value for correcting the relative positional relationship between the camera 61 and the image display unit.

The interface 180 is an interface for connecting various external devices OA which are supply sources of the contents to the control unit 10. Examples of the external device OA include a storage device which stores an AR scenario, a personal computer (PC), a portable telephone terminal, and a game terminal. For example, a USB interface, a micro-USB interface, or an interface for a memory card may be used as the interface 180.

As shown in FIG. 3, the image display unit 20 includes the right display driving section 22, the left display driving section 24, the right light guiding plate 261 as the right optical image display section 26, the left light guiding plate 262 as the left optical image display section 28, and the camera 61.

The right display driving section 22 includes the reception unit 53 (Rx 53), the right backlight control unit 201 (right BL control unit 201) and a right backlight 221 (right BL 221) that function as a light source, the right LCD control unit 211 and a right LCD 241 that function as a display element, and the right projection optical system 251. The right backlight control unit 201 and the right backlight 221 function as the light source. The right LCD control unit 211 and the right LCD 241 function as the display element.

The reception unit 53 functions as a receiver for serial transmission between the control unit 10 and the image display unit 20. The right backlight control unit 201 drives the right backlight 221 based on the input control signal. The right backlight 221 is, for example, a luminous body such as LED or electroluminescence (EL). The right LCD control unit 211 drives the right LCD 241 based on the control signals transmitted from the image processing unit 160 and the display control unit 190. The right LCD 241 is a transparent liquid crystal panel in which a plurality of pixels is arranged in the form of matrix.

The right projection optical system 251 includes a collimating lens that transforms image light rays emitted from the right LCD 241 into a pencil (a light flux) of parallel light rays. The right light guiding plate 261 as the right optical image display section 26 guides the image light rays output from the right projection optical system 251 to a right eye RE of the user while reflecting the image light rays along a predetermined optical path. The left display driving section 24 has the same configuration as that of the right display driving section 22 and corresponds to a left eye LE of the user, and thus, the description thereof will be omitted.

A-3. Pose Calculating Process

Figure 4:
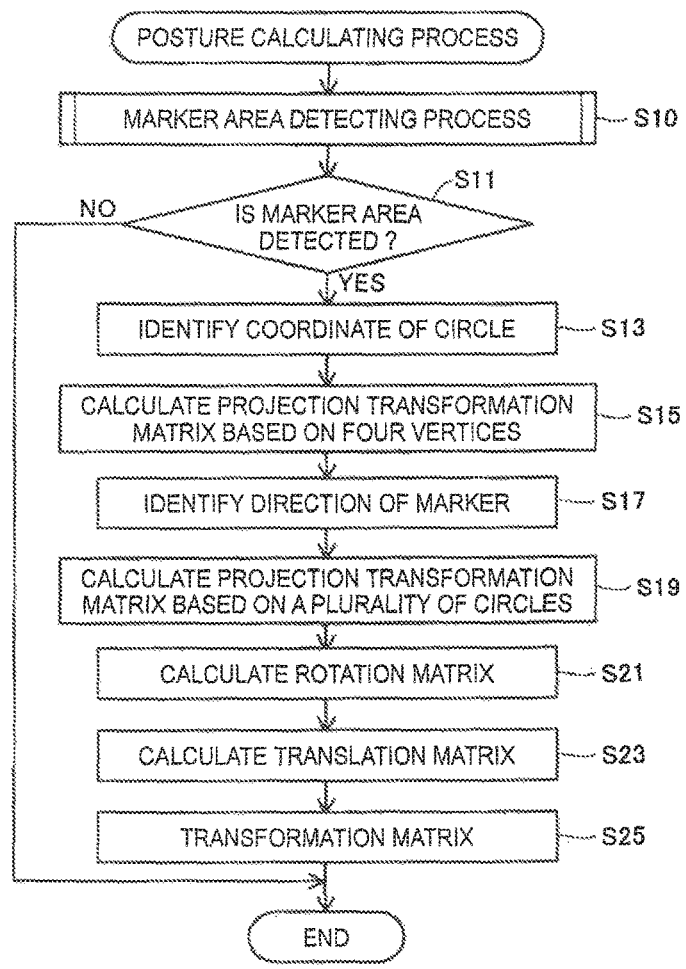
FIG. 4 is a flowchart of a pose calculating process of the first embodiment.

FIG. 4 is a flowchart of a pose calculating process according to the present embodiment. A pose calculating process is a process performed by the CPU 140 in order to calculate or derive the relative positional relationship between the marker MK1 and the camera 61 by using the marker MK1 included in the captured image obtained by the camera 61. In the pose calculating process, the marker identifying unit 165 performs a marker area detecting process of detecting an external shape of the marker MK1 from the captured image obtained by the camera 61 (step S10).

Figure 5:
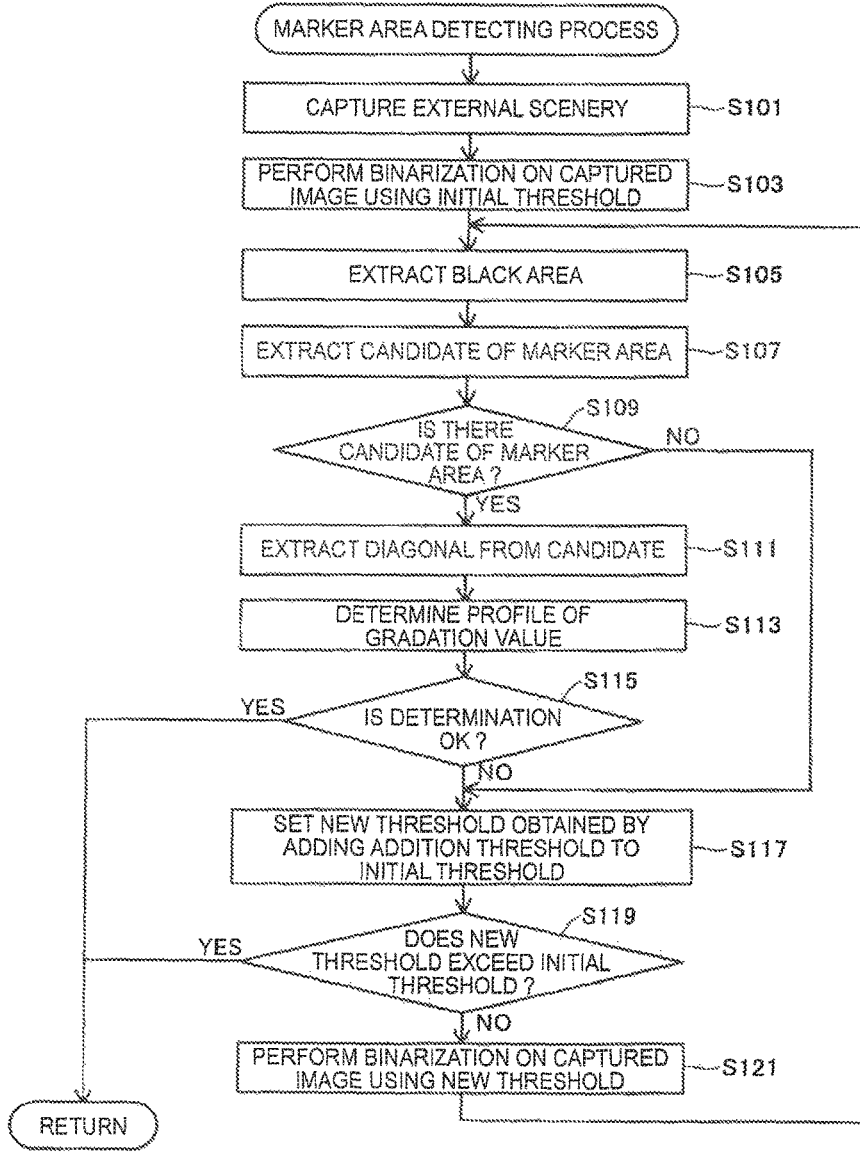
FIG. 5 is a flowchart of a marker area detecting process of the first embodiment.

FIG. 5 is a flowchart of the marker area detecting process of the present embodiment. As shown in FIG. 5, in the marker area detecting process, the marker identifying unit 165 first captures an external scenery by using the camera 61 (step S101). In the present embodiment, the captured image is obtained as data of gradation values with 256 steps of 0 to 255 of RGB (Red, Green, and Blue). In the present embodiment, the smaller the gradation value is, the darker the color is set.

Figure 6:
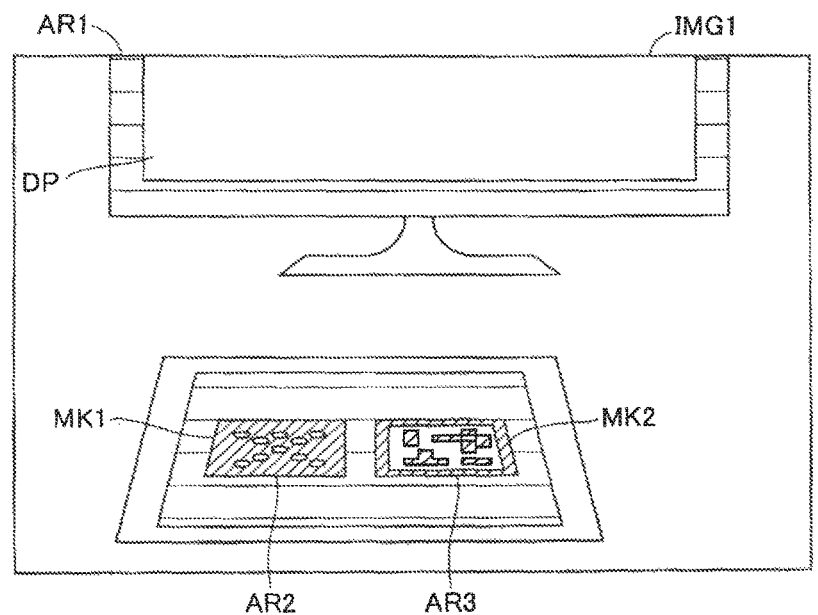
FIG. 6 is an explanatory diagram showing an example of a captured image captured by a camera.

FIG. 6 is an explanatory diagram showing an example of a captured image IMG1 captured by the camera 61. The captured image IMG1 shown in FIG. 6 includes a display DP of a desk top-type personal computer (PC), the marker MK1, and a marker MK2 different from the marker MK1. The adaptive thresholding method is used for binarization. As described below, by employing the adaptive thresholding method, lighting variation can be properly handled. In FIG. 6, pixels whose all the gradation values of the RGB are less than the default threshold, for example 100, are represented by hatched portions with oblique lines, pixels whose all the gradation values of the RGB are equal to the default threshold or more are represented by hatched portions with horizontal lines, and other pixels are represented by non-hatched portions.

When the external scenery is captured (step S101 of FIG. 5), the marker identifying unit 165 performs the binarization on the captured image IMG1 obtained by the camera 61 by using the initial threshold (step S103). In the present embodiment, the gradation value of 100 (the initial default threshold) is previously set as the initial threshold, and the gradation value of 28 is set as the addition/subtraction amount. The initial threshold of 100 and the addition/subtraction amount of 28 are examples of the adaptive thresholding approach. The marker identifying unit 165 sets the binarized pixels to be 1 when the gradation values of any pixels of the RGB are equal to or greater than the current threshold, and sets the binarized pixels to be 0 when the gradation values of pixels of the RGB are less than the current threshold.

When the binarization is performed on the captured image IMG1 by using the initial threshold which is the gradation value of 100, the marker identifying unit 165 detects an area AR1 which is an outer frame of the display DP, an area AR2 including the marker MK1, and an area AR3 including the marker MK2, as the black area (step S105). The marker identifying unit 165 extracts the quadrilateral black area, which is an aspect ratio having a predetermined range stored in the marker storage unit 139 and has a predetermined size, from the detected black area, as a candidate of the marker area (step S107). The marker MK1 included in the captured image IMG1 is not necessarily detected as the quadrilateral of the square shape, and depending on a distance between the marker MK1 and the camera 61 or the orientation of the camera 61, the marker MK1 is captured as a small shape, or is captured as a trapezoid shape or a rectangular shape. Thus, in order to detect only the marker MK1 having a predetermined size and a predetermined positional relationship, the marker storage unit 139 previously stores the aspect ratio or size of the marker MK1 desired to be detected from the captured image. The marker identifying unit 165 extracts the area AR2 and the area AR3, which has a predetermined size and a predetermined aspect ratio, within the extracted black area, as a candidate of the marker area by using four sides formed by connecting four vertices.

Subsequently, the marker identifying unit 165 determines whether or not one or more areas are extracted as candidates of the marker area (step S109). Since the area AR2 is detected as the candidate of the marker area (step S109: YES), the marker identifying unit 165 extracts two diagonals from a quadrilateral shape of the candidate of the marker area (step S111). The marker identifying unit 165 extracts two diagonals by connecting two vertices which are not adjacent to each other in the area AR2 in a straight line.

The marker identifying unit 165 performs scanning along the extracted diagonals, and performs profile determination on the gradation values of the binarized white and black colors (step S113). The marker identifying unit 165 determines whether or not the candidate of the marker area is the marker MK1 in comparison with the arrangement of the black color and white color along the diagonals of the marker MK1 stored in the marker storage unit 139 (step S115).

Figure 7:
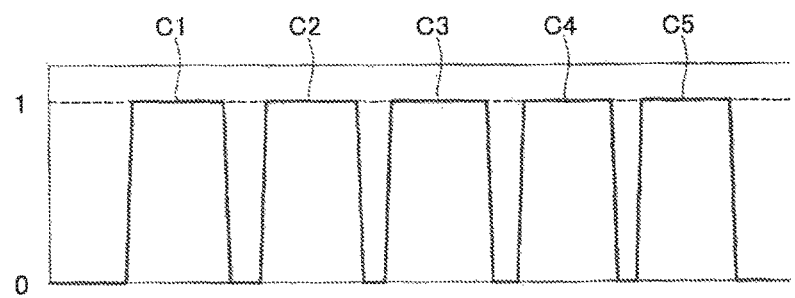
FIG. 7 is an explanatory diagram showing a profile of binarized gradation values along diagonals of the marker.

FIG. 7 is an explanatory diagram showing a profile of the binarized gradation value along the diagonal CL1 of the marker MK1. When the marker MK1 shown in FIG. 1 is binarized, the profile of the gradation value from the lower right side of the diagonal CL1 to the upper left side thereof represents a polygonal line shown in FIG. 7. Since the gradation value of 0 represents the black color and the gradation value of 1 represents the white color, the gradation values along the diagonal CL1 of the areas of the white circles C1, C2, C3, C4, and C5 are "1"s. The marker storage unit 139 stores data for specifying the gradation values along the two diagonals CL1 and CL2 shown in FIG. 7.

In the process of step S113 of FIG. 5, the marker identifying unit 165 determines whether or not the profile of the gradation values along the two diagonals of the area AR2 of FIG. 6 is the same as the profile of the gradation values along the diagonals CL1 and CL2 stored in the marker storage unit 139. In the case where the gradation values along the diagonals of the area AR2 are clearly different from the gradation values along the diagonals CL1 and the CL2 stored in the marker storage unit 139 (step S115: NO), the marker identifying unit 165 sets 128 obtained by adding the gradation value of 28 which is the addition amount to the gradation value of 100 which is the initial threshold, as a new threshold (step S117). In the present embodiment, the marker identifying unit 165 determines a difference between the profile of the gradation value along the diagonals of the candidate of the marker area and the profile of the gradation values along the diagonals CL1 and CL2 stored in the marker storage unit 139 in consideration of a predetermined error.

The marker identifying unit 165 determines whether or not the newly set threshold exceeds the initial threshold (step S119). In the present embodiment, in some scenarios, for example when lighting changes, it might not be able to extract the marker MK1 from the captured image IMG1 using the initial threshold, the marker identifying unit 165 sequentially adds/subtracts the addition/subtraction amount to/from the current threshold, the marker identifying unit 165 determines whether it is able to extract the marker MK1 form the captured image IMG1, and ends the marker area detecting process. If a marker MK1 is detected, the current threshold may be set as the default threshold and used for the marker detection in the future frames. If no markers are detected after trying all the possible thresholds, the default threshold is not necessarily changed. For example, the new threshold is sequentially increased to 128, 156, 184, 212, and 240 from the initial threshold of 100. Since the upper limit of the gradation value is 255, the marker identifying unit 165 returns the threshold from 255 to 0 when the threshold exceeds 240, and sets a new threshold to be 12, 40, and 78 in this order. When the addition amount which is 28 is added to the threshold of 78, the new threshold exceeds the initial threshold. Thus, in the process of step S119, when it is determined that the new threshold exceeds the initial threshold (step S119: YES), the marker identifying unit 165 determines that it is not able to extract the marker MK1 from the captured image IMG1, and ends the marker area detecting process maintaining the initial threshold of 100.

In the process of step S119, when it is determined that the new threshold does not exceed the initial threshold (step S119: NO), the marker identifying unit 165 performs the binarization on the captured image IMG1 by using the new threshold of 128 (step S121). Thereafter, the marker identifying unit 165 repeatedly performs the processes from step S105 to step S115. That is, the marker identifying unit 165 extracts the black area from the binarized captured image (step S105). The marker identifying unit 165 determines whether or not there is the candidate of the marker area determined as having the same external shape of the marker MK1 (step S107). In the present embodiment, it is assumed in the description below that the marker identifying unit 165 extracts not the areas AR1 AR2 and AR3, but the marker MK1 and the marker MK2, as the black area at step S105.

Specifically, the marker identifying unit 165 extracts the marker MK1 and the marker MK2, as the candidates of the marker area by comparing the quadrilateral shape of the extracted marker MK1 and the quadrilateral shape of the extracted marker MK2 with the aspect ratio and size stored in the marker storage unit 139 (step S107). Since the marker MK1 and the marker MK2 are the candidates of the marker area (step S109: YES), the marker identifying unit 165 extracts the diagonals of the marker MK1 and the marker MK2 (step S111). The marker identifying unit 165 determines that the profile of the gradation values along the diagonals of the extracted marker MK1 is the same as the profile of the gradation values stored in the marker storage unit 139 (step S113). That is, the marker identifying unit 165 determines that the image of the marker MK1 extracted as the candidate of the marker area from the captured image IMG1 is the marker MK1.

In the process of step S109, when it is not able to extract the candidate of the marker area from the captured image IMG1 (step S109: NO), the marker identifying unit 165 performs the process of step S117 and its subsequent processes.

Figure 8A:
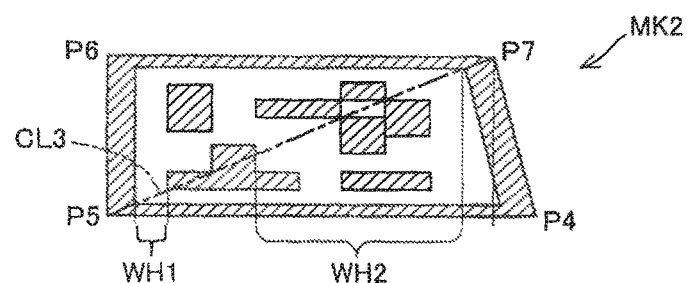
FIGS. 8A and 8B are explanatory diagrams showing the relationship between the diagonals of the extracted marker and the gradation values along the diagonals.
Figure 8B:
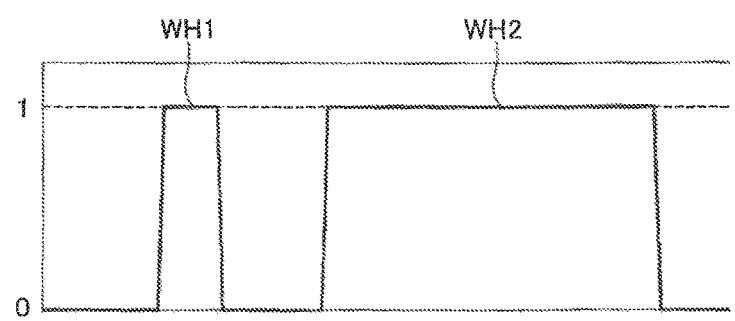

FIGS. 8A and 8B are explanatory diagrams showing the relationship between the diagonals of the extracted marker MK2 and the gradation values along the diagonals. FIG. 8A is an enlarged view of the captured MK2. As shown in FIG. 8A, the marker MK2 has a quadrilateral shape formed by connecting four vertices P4, P5, P6, and P7 in a straight line. There are areas divided into black and white areas by combining a plurality of quadrilaterals within the marker MK2.

FIG. 8B shows a polygonal line representing the arrangement of the gradation values along the diagonal CL3 that connects the vertex P5 and the vertex P7 of the marker MK2 shown in FIG. 8A. FIGS. 8A and 8B show a white portion WH1 and a white portion WH2 whose binarized gradation values are zero. As shown in FIG. 8B, the arrangement of the gradation values along the diagonals of the marker MK2 is different from any one of the arrangements (profiles) of two gradation values stored in the marker storage unit 139. For this reason, after the diagonals of the marker MK2 are extracted (step S111), the marker identifying unit 165 determines that the marker MK2 extracted as the candidate of the marker area is different from the marker MK1 (step S113).

In the process of step S115, the marker identifying unit 165 extracts from the captured image IMG1 the same marker MK1 as the marker MK1 (hereinafter, referred to as a model marker MK3) stored in the marker storage unit 139 (step S115: YES), and ends the marker area detecting process.

When the marker area detecting process of step S10 of FIG. 4 is ended, the marker identifying unit 165 determines whether or not the marker area is detected from the captured image IMG1 in the marker area detecting process (step S11). When it is not able to detect the marker area (step S11: NO), the marker identifying unit 165 ends the pose calculating process.

When the marker area is detected (step S11: YES), the coordinate identifying unit 166 identifies the coordinate values of the centers of the plurality of circles included in the marker MK1 by using the gradation values of the pixels of the binarized captured image IMG1 (step S13). The coordinate identifying unit 166 identifies the coordinates of the centers of the plurality of circles included in the square-shaped marker MK1 by using the gradation values of the pixels of the binarized captured image IMG1 in addition to the coordinates of the four vertices for specifying the external appearance of the marker MK1 (step S13). Subsequently, the calculation unit 167 calculates the relationship between an object coordinate (x, y) on the XY plane in the external scenery and an image coordinate (p, q) in the captured image IMG1 by using the four vertices of the marker MK1 extracted from the captured image IMG1 and the four vertices P0, P1, P2, and P3 of the model marker MK3 (FIG. 1) (step S15).

Figure 9:
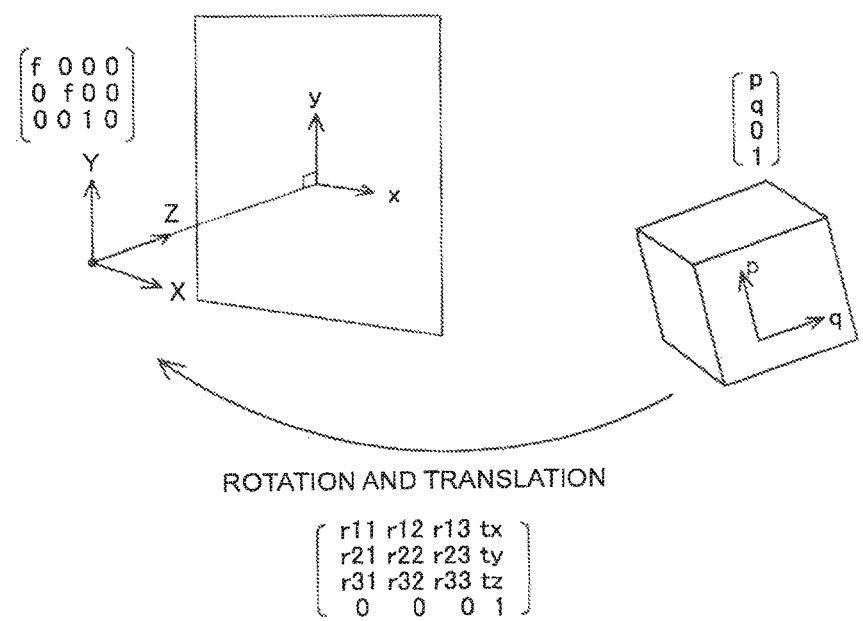
FIG. 9 is an explanatory diagram for describing a projection transformation matrix that transforms an image coordinate into an object coordinate.

FIG. 9 is an explanatory diagram for describing a projection transformation matrix H1 that transforms the object coordinate into the image coordinate. As shown in FIG. 9, the object coordinate (p, q) included in the captured image IMG1, a focal distance f of the camera 61, and the image coordinate (x, y) are expressed as Expression (1) by using a matrix including rotation and translation. r11 to r33 included in Expression (1) are a matrix representing the rotation, and tx, ty, and tz are a matrix representing the translation.

$$\begin{bmatrix} x \\ y \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} r11 & r12 & r13 & tx \\ r21 & r22 & r23 & ty \\ r31 & r32 & r33 & tz \\ 0 & 0 & 0 & 1 \end{bmatrix} \begin{bmatrix} p \\ q \\ 0 \\ 1 \end{bmatrix} \quad (1)$$

Since the value of the third row of a matrix in 4 rows and 1 column on the right side of Expression (1) are zero, Expression (2) can be derived from Expression (1).

$$\begin{bmatrix} x \\ y \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} r11 & r12 & tx \\ r21 & r22 & ty \\ r31 & r32 & tz \\ 0 & 0 & 1 \end{bmatrix} \begin{bmatrix} p \\ q \\ 1 \end{bmatrix} \quad (2)$$

Since all the values of the fourth column of a matrix in 3 rows and 4 columns on the right side of Expression (2) are zero, Expression (3) can be derived from Expression (2), and Expression (4) is obtained by transforming Expression (3).

$$\begin{bmatrix} x \\ y \\ 1 \end{bmatrix} \sim \begin{bmatrix} f & 0 & 0 \\ 0 & f & 0 \\ 0 & 0 & 1 \end{bmatrix} \begin{bmatrix} r11 & r12 & tx \\ r21 & r22 & ty \\ r31 & r32 & tz \end{bmatrix} \begin{bmatrix} p \\ q \\ 1 \end{bmatrix} \quad (3)$$

$$\begin{bmatrix} x \\ y \\ 1 \end{bmatrix} \sim \begin{bmatrix} fr11 & fr12 & ftx \\ fr21 & fr22 & fty \\ r31 & r32 & tz \end{bmatrix} \begin{bmatrix} p \\ q \\ 1 \end{bmatrix} \quad (4)$$

Here, it is assumed that the respective elements of the projection transformation matrix H1 desired to calculate are h11 to h33, Expression (5) is obtained.

$$\begin{bmatrix} x \\ y \\ 1 \end{bmatrix} \sim \begin{bmatrix} h11 & h12 & h13 \\ h21 & h22 & h23 \\ h31 & h32 & h33 \end{bmatrix} \begin{bmatrix} p \\ q \\ 1 \end{bmatrix} \quad (5)$$

Expression (6) is calculated using coordinate values of the four vertices extracted from the captured IMG1, and P0m (p0, q0), P1m(p1, q1), P2m(p2, q2), and P3m(p3, q3). h33 may be 1.

$$\begin{bmatrix} p0 & q0 & 1 & 0 & 0 & 0 & -p0x0 & -q0x0 \\ 0 & 0 & 0 & p0 & q0 & 1 & -p0y0 & -q0y0 \\ p1 & q1 & 1 & 0 & 0 & 0 & -p1x1 & -q1x1 \\ 0 & 0 & 0 & p1 & q1 & 1 & -p1y1 & -q1y1 \\ p2 & q2 & 1 & 0 & 0 & 0 & -p2x2 & -q2x2 \\ 0 & 0 & 0 & p2 & q2 & 1 & -p2y2 & -q2y2 \\ p3 & q3 & 1 & 0 & 0 & 0 & -p3x3 & -q3x3 \\ 0 & 0 & 0 & p3 & q3 & 1 & -p3y3 & -q3y3 \end{bmatrix} \begin{bmatrix} h11 \\ h12 \\ h13 \\ h21 \\ h22 \\ h23 \\ h31 \\ h32 \end{bmatrix} = \begin{bmatrix} x0 \\ y0 \\ x1 \\ y1 \\ x2 \\ y2 \\ x3 \\ y3 \end{bmatrix} \quad (6)$$

Expression (7) is derived by transforming Expression (6) with alphabets representing the matrixes, and Expression (8) is obtained by transforming Expression (7).

$$A \cdot H1 = b \quad (7)$$

$$H1 = A^{-1} \cdot b \quad (8)$$

As discussed above, in step S15 of FIG. 4, the calculation unit 167 calculates the projection transformation matrix H1 (plane projection transformation matrix or homography matrix H1) based on the four vertices by solving Expressions (1) to (8).

The correspondence relationship between 10 circles of the model marker MK3 and 10 circles extracted from the image is found using the projection transformation matrix H1 (homography matrix H1).

In the present embodiment, a coordinate (model Pt_x[i], model Pt_y[i]) of the circle of the model marker MK3 on the model coordinate system is first transformed into a coordinate (xpi, ypi) of the image coordinate system by the projection transformation matrix H1.

$$d_i = h31*\text{model}Pt\_x[i] + h32*\text{model}Pt\_y[i] + h33 \quad (9)$$

$$x_{pi} = (h11*\text{model}Pt\_x[i] + h12*\text{model}Pt\_y[i] + h13)/d_i \quad (10)$$

$$y_{pi} = (h21*\text{model}Pt\_x[i] + h22*\text{model}Pt\_y[i] + h23)/d_i \quad (11)$$

The distances between the transformed or projected coordinates and the coordinates of the 10 circles extracted (detected) from the captured image are compared. That is, in the case of the extracted i-th circle, $\text{Min}_k[\text{Pd}_i, \text{Pd}_k]$ is obtained. Here, $\text{Pd}_i$ is a coordinate of the extracted (detected) i-th circle, and $\text{Pp}_k$ is a coordinate of the model marker MK3. i and k are respectively integers of 1 to 10. [ ] means a norm, and Min means that a minimum value for k of 1 to 10 is obtained. The circles represented by a combination of i and k having the shortest distance correspond to each other. Thus, it can be seen that the 10 extracted (detected) circles correspond to any of the 10 circles of the model marker MK3. In order to prevent a correspondence error, the calculation unit 167 identifies the direction of the marker MK1 extracted from the captured image IMG1 by using the coordinate value of the center C10P of the direction-identification circle C10 of the model marker MK3.

Figure 10:
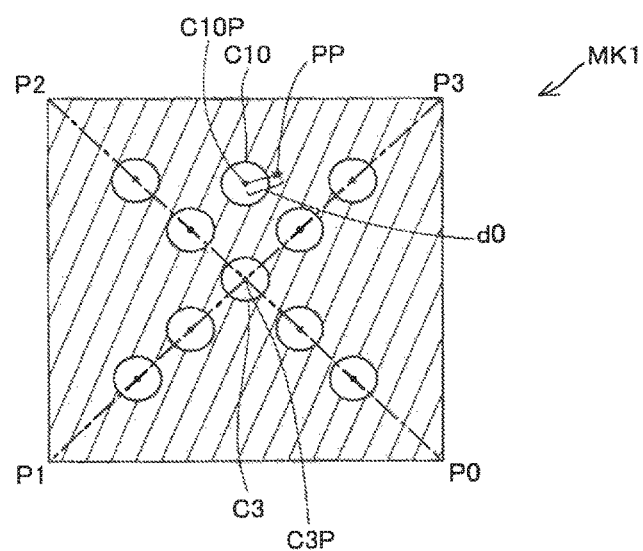
FIG. 10 is an explanatory diagram for describing the specifying of the extracted marker.

FIG. 10 is an explanatory diagram for describing the identifying of the direction of the extracted marker MK1. FIG. 10 shows the model marker MK3, and a center PP of the direction-identification circle in the marker MK1 extracted from the image. The calculation unit 167 derives four coordinates of the C10P when the model marker MK3 is rotated by 00, 900, 180°, and 270° on the model coordinate system. The calculation unit 167 transforms or projects the four coordinates of the C10P into the coordinates of the image coordinate system by operating the projection transformation matrix H1, and derives distances between the 4 transformed coordinates and the coordinates of the circle determined as corresponding to the direction-identification circle C10. A pair of circles having the shortest distance therebetween has a correct correspondence relationship of the direction-identification circle C10P, and thus, it is possible to identify the direction of the marker MK1 on the captured image based on the correct correspondence relationship of the direction-identification circle C10P. When necessary, since it is possible to correct the correspondence relationship of the circles other than the direction-identification circle C10 based on the position of the direction-identification circle C10, the correspondence relationship between the circles belonging to the model marker MK3 and the circles belonging to the marker MK1 on the captured image becomes more clear. Accordingly, it is possible to accurately determine the orientation of a virtual coordinate axis fixed on the marker MK1.

When the direction of the marker is identified, the calculation unit 167 calculates a projection transformation matrix H2 having higher accuracy than that of the projection transformation matrix H1 by using the coordinates of the centers of 9 circles (excluding the direction-identification circle C10) using the center C3P of the marker MK1 as its origin (step S19). The calculation unit 167 calculates a projection transformation matrix H2 having a less error by solving Expressions (6) to (8) by using 9 coordinate values greater than four. All the four points are points of angles as described above, and the reproducibility when the center of the circle is detected may be double the reproducibility when the corners or the points of the angles are detected. From this regard, the centers of circles are detected accurately, and the projection transformation matrix which brings less error is resulted. Of course, the projection transformation matrix H2 may be calculated using the coordinate values of the identification points including the direction-identification point (C10P).

When the projection transformation matrix H2 is calculated, the calculation unit 167 calculates a rotation matrix for identifying a marker pose including the concept of the position and orientation of the captured marker MK1 (step S21). The calculation unit 167 defines new three column vectors h1, h2, and h3 from the calculated projection transformation matrix H2, and defines the rotation matrix R as Expression (12) below.

$$R=[r1 r2 r3] \quad (12)$$

In Expression (5), since the column vectors h1 (h11, h21, h31) and h2 (h12, h22, h32) are plane rotation vectors and the column vector h3(h13, h23, h33) is a plane translation vector, the rotation matrix R is calculated using the projection transformation matrix H2. A column vector r1 is calculated using the column vector h1, and the relationship of Expression (13) is satisfied.

$$r1=K^{-1}*h1 \quad (13)$$

Here, when principal point position coordinates on the image sensor plane of the camera 61 are expressed as (Cx, Cy), it is possible to express a matrix K of Expression (13) as Expression (14) below.

$$K = \begin{bmatrix} fx & 0 & Cx \\ 0 & fy & Cy \\ 0 & 0 & 1 \end{bmatrix} \quad (14)$$

Here, when the column vector r1 is normalized and a norm λ is calculated, a column vector r2 can be calculated as Expression (15).

$$r2=K^{-1}h2/\lambda \quad (15)$$

A column vector r3 can be calculated as the cross product of the column vector r1 and the column vector r2. The calculation unit 167 ensures that the rotation matrix R is an orthogonal matrix by performing singular value decomposition on the thus obtained rotation matrix R.

When the rotation matrix R is calculated, the calculation unit 167 calculates a translation matrix T from the following expression by using the column vector h3 used when the rotation matrix R is calculated (step S23).

$$T=K^{-1}*h3/\lambda \quad (16)$$

The calculation unit 167 calculates a correction matrix that allows the object coordinates to correspond to the pixels of the optical image display sections 26 and 28 that display the image by using the calculated rotation matrix R and translation matrix T (step S25). Thereafter, the CPU 140 ends the pose calculating process.

In the present specifications, the rotation matrix R and the translation matrix T obtained through the pose calculating process are referred to as a "first pose" of the marker MK1 with respect to the capturing unit.

The accuracy of the first pose obtained by the aforementioned method may be further improved by a "model alignment" process. In the present embodiment, specifically, a plurality (for example, 9) of coordinates belonging to the model marker MK3 is transformed or projected into coordinates of the image coordinate system by using the camera parameters of the capturing unit and the rotation matrix R and the translation matrix T representing the first pose. A cost function including the sum of squares of the respective differences between the plurality of transformed or projected coordinates and the corresponding coordinates of the marker MK1 on the captured image is derived. Parameters included in the rotation matrix R and the translation matrix T are optimized by being changed by a Gauss-Newton method such that the cost function becomes a global minimum. In this case, for the sake of easiness in calculation, the parameters included in the rotation matrix R may be expressed as quaternions. The rotation matrix R and the translation matrix T when the cost function reaches the global minimum may be a higher-accuracy pose of the marker MK1. In this case, the rotation matrix R and the translation matrix T are expressed as a "second pose" of the marker MK1 with respect to the capturing unit.

Modification Example A

A tracking result of the marker MK1, that is, a tracking result of the second pose of Embodiment 1 is used in an optical see-through calibration or an AR application. In order to improve usability, it is preferable that the sequentially obtained second poses are stabilized. In the present embodiment, the pose is stabilized by applying smoothing using an exponential function or a Gaussian function to the second pose of the marker MK1, and "pose jitter" is reduced.

1. Main Cause of Jitter

The extraction error of the identification points (centers of the circles) is one of jitter sources. When the marker is not so small, the accuracy of the center of the circle of the marker MK1 is a level of a subpixel, and the extraction error of the identification point can be ignored. When the marker is small, the detection accuracy of the center of the circle is not guaranteed in some cases, and the extraction error of the identification point may be one of main jitter sources. Accordingly, it is preferable that a marker size is large to some extent in order to reduce the jitter caused during the detection of the identification points. For example, in the case of a HMD of a certain specification, when the marker size is 4 cm, the jitter may be observed at a distance corresponding to the length of the arm. Meanwhile, when the marker size is 6 cm, the jitter is nearly not observed.

The result obtained through an experiment implies that the jitter caused by the movement of the head of the user (person) is a main cause of the jitter of the pose of the HMD. According to some experiments on various levels of the movement of the head, in order to test a jitter level when the head is not moved, an examinee is requested that their head is not moved during a reading instruction. During this test, the jitter is observed in an extremely small angle range within 50 ms (0.05 to 0.15 degrees). This is equivalent to a speed of 1 to 3 degrees per second. In order to test the jitter level with respect to the slow movement of the head, the examinee is requested that their head is slowly moved during the assembling of the object. During this test, the jitter is observed along with the rotation (0.1 to 0.75 degrees) of a narrow angle range within 50 ms. This is equivalent to a speed of 2 to 15 degrees per second. The jitter is observed for a general movement of the head along with the rotation (0.8 to 5 degrees) in a wider angle range within 50 ms. This is equivalent to 15 to 100 degrees every second.

In the modification example, the second pose is smoothened by suppressing the jitter occurring in the second pose, and the second pose is stabilized when the head is substantially not moved or when the head is slowly moved. Meanwhile, when the head is normally moved, the second pose is not nearly smoothened. The details are as follows.

2. Smoothing Using Exponential Function

A simplest mode of the smoothing using an exponential function is given to the rotation matrix, as following expression.

$$s_0 = q_0 \quad (17)$$

$$s_t = \alpha q_t + (1-\alpha) s_{t-1} \quad t > 0 \quad (18)$$

Here, a subscript corresponds to, for example, a camera frame. $\alpha$ is a smoothing factor of $0 < \alpha < 1$, and q is a rotation angle vector expressed as quaternions. That is, $$q = [q_x, q_y, q_z, q_w] \quad (19)$$

The detailed description of a transformation expression between the rotation matrix R and the quaternions will be omitted. Similarly, an expression for smoothing the translation matrix of the pose is as follows;

$$s_{=0} = T_0 \quad (20)$$

$$s_t = \alpha_1 T_t + (1-\alpha_1) s_{t-1}, \quad t > 0 \quad (21)$$

The jitter in the rotation is more remarkable. Meanwhile, the jitter in the translation is not remarkable. For this reason, $\alpha 1$ may be set to be 1. This means that the jitter is smoothened by a rotation angle.

3. Estimation of Smoothing Factor $\alpha$

When it is assumed that the jitter of the head is mainly present in X and Y directions and the rotation around the Z axis (substantially field-of-view direction) can be ignored, the estimation of the movement of the head can be simplified as the estimation of a vector ($\Delta u$, $\Delta v$) in the X and Y coordinate in the captured image. As one method of estimating the vector ($\Delta u$, $\Delta v$), the maximum value (or average value) of differences between x and y coordinates of the centers of the circles between a current frame and a past frame is calculated. $\alpha$ is estimated as follows.

$$\alpha = e^{-\omega^2/2\sigma^2} = e^{-(\Delta u^2 + \Delta v^2)/2f^2\sigma^2} \quad (22)$$

It is assumed that a frame rate of the camera 61 of the HMD is, for example, 30 fps. A focal distance f is obtained from the specification of the camera 61. $\sigma$ is obtained as the optimum value through an experiment. Thus, since f,$\sigma$ are already known, $\alpha$ is updated by Expression (22), and the rotation is updated by Expression (18). Accordingly, the second pose may be obtained through such updates. Although it has been described in the preset modification example that the second pose is smoothened, the first pose may be smoothened in another embodiment.

Modification Example B

In the AR application, when the marker tracking is slow, latency is easily remarkable. Accordingly, it is preferable that the detection speed of the marker MK1 is a high speed. For this reason, in order to improve the entire processing speed and to maintain the detection accuracy of the marker MK1, an approach to high accuracy from low accuracy may be applied to a processing pipeline.

For example, the previous processes and the marker area detecting process (step S10 of FIG. 4) of the aforementioned embodiment are performed based on the reduced captured image, and thus, a main time-consumed portion may be obtained at a high speed. The process of identifying the coordinates in the aforementioned embodiment (step S14 of FIG. 4) and the subsequent processes are performed based on the resolution of the original captured image, and thus, the position accuracy of the identification points and the estimation accuracy of the pose may be obtained.

As described above, the marker MK1 of the present embodiment has the quadrilateral shape formed by the four vertices P0, P1, P2, and P3. The quadrilateral-shaped marker MK1 includes the first circle group CG1 and the second circle group CG2, which include the plurality of circles, and the direction-identification circle C10 whose center is C10P. Thus, when the marker MK1 is included in the captured image obtained by the camera 61, the marker identifying unit 165 identifies the external shape of the marker MK1 by using the four vertices. The marker identifying unit 165 identifies the position and pose of the marker MK1 by the circles included in the first circle group CG1 and the second circle group CG2, and the center C10P of the direction-identification circle C10 for identifying the direction of the marker MK1. Thus, the device such as the HMD 100 including the camera 61 can more accurately specify the position and pose of the marker MK1 with respect to the camera 61, and can more accurately superimpose the image displayed by the image display unit 20 in the external scenery by using the specified positional relationship. Accordingly, the calibration for image superimposition is accurately performed by capturing the marker MK1 of the present embodiment, and the convenience of the user who sees the image displayed by the image display unit is improved.

The marker MK1 of the present embodiment includes the circle C3 having the center C3P at the intersection of the two diagonals CL1 and CL2 of the marker MK1. For this reason, in the marker MK1 of the present embodiment, in order to specify the coordinates of the captured marker MK1, it is possible to allow the device such as the HMD 100 to more accurately recognize the external shape of the marker MK1 by using the center C3P of the circle C3 as its origin.

In the marker MK1 of the present embodiment, the circle C3 is a circle which is included in the first circle group CG1 and is included in the second circle group CG2. For this reason, unlike the case where the circle C3 is included in only any one of the first circle group CG1 and the second circle group CG2, it is easy to specify the center of the marker MK1 when the marker MK1 is captured.

In the marker MK1 of the present embodiment, the center C10P for identifying the direction of the marker MK1 is a central point of the circle C10 other than the circle C3 which is the central circle of the marker MK1. For this reason, when the marker MK1 of the present embodiment is captured, since a point other than the C3P which is a coordinate of the origin for recognizing the marker MK1 is used as the point for identifying the direction of the marker MK1, it is possible to more accurately identify the direction of the captured marker MK1.

In the marker MK1 of the present embodiment, the direction-identification circle C10 for identifying the direction of the marker MK1 is a circle that is not included in any one of the first circle group CG1 and the second circle group CG2. For this reason, when the marker MK1 of the present embodiment is captured, since the direction of the marker MK1 is identified by the direction-identification circle C10 which is a circle different from the first circle group CG1 and the second circle group CG2 for identifying the marker MK1, the direction of the marker MK1 is more accurately specified.

In the marker MK1 of the present embodiment, since the direction of the marker MK1 is identified by the direction-identification circle C10 which is one circle, the direction of the marker MK1 is simply specified unlike the case where the direction of the marker MK1 is specified by the plurality of elements.

In the marker MK1 of the present embodiment, the first circle group CG1 and the second circle group CG2 are formed so as to have point symmetry or line symmetry about the center C3P of the circle C3. The plurality of circles included in the marker MK1 has the same size. For this reason, when the marker MK1 of the present embodiment is captured, if only the presence of the marker MK1 is extracted from the captured image obtained by the camera 61, it is possible to more simply extract the marker.

In the marker MK1 of the present embodiment, the circles included in the marker MK1 and the portions other than the circle are different in color, and the colors of the marker MK1 are black and white. For this reason, when the marker MK1 of the present embodiment is captured, the circles included in the marker MK1 are distinguished from other portions, and thus, it is easy to specify the marker MK1.

In the marker MK1 of the present embodiment, the first circle group CG1 and the second circle group CG2 includes odd number of circles which have the same size, and the distance between the centers of the adjacent circles in the first circle group CG1 and the distance between the centers of the adjacent circles in the second circle group CG2 are equal. For this reason, when the marker MK1 of the present embodiment is captured, if only the presence of the marker MK1 is extracted from the captured image obtained by the camera 61, it is possible to more simply extract the marker MK1.

In the method of detecting the marker MK1 of the present embodiment, the marker identifying unit 165 can extract the marker MK1 from the captured image obtained by the camera 61. The coordinate identifying unit 166 identifies the center C10P of the direction-identification circle C10 for identifying the direction of the extracted marker MK1 and the other centers of the plurality of circles included in marker MK1. The calculation unit 167 calculates the correction value or matrix using the rotation matrix R and the translation matrix T based on the center C10P of the specified direction-identification circle C10 and the centers of the plurality of other circles. For this reason, since the method of detecting the marker MK1 of the present embodiment is used, the device such as the HMD 100 can allow the user to see the display image superimposed on the captured external scenery by setting the pixels of the image display unit that displays the image data based on the display image based on the correction value or matrix. Thus, it is possible to improve the convenience or usability when the user uses the HMD 100.

In the method of detecting the marker MK1 of the present embodiment, the marker identifying unit 165 determines whether or not to extract the candidate of the marker area from the captured image obtained by performing the binarization using the initial threshold on an image of the captured external scenery. When it is determined not to extract the candidate of the marker area, the marker identifying unit 165 determines to extract the candidate of the marker area by using the new gradation value obtained by adding the addition amount to the initial threshold as the threshold. The marker identifying unit 165 extracts the candidate of the marker area by using the gradation value obtained by adding the addition amount to the threshold as the threshold until the candidate of the marker area is extracted. When the new threshold exceeds the gradation value set to be the initial threshold as the predetermined threshold, the marker identifying unit 165 ends the process of extracting the candidate of the marker area. For this reason, in the method of detecting the marker MK1 of the present embodiment, since the device such as the HMD 100 that detects the marker MK1 performs the binarization on one captured image multiple times by using thresholds of different gradation values, when the marker MK1 is included in the captured image, it is easy to more accurately extract the marker MK1.

In the method of detecting the marker MK1 of the present embodiment, the marker identifying unit 165 identifies a plurality of identification points for identifying the marker MK1 as the central points of the plurality of circles included in the marker MK1. For this reason, in the method of detecting the marker MK1 of the present embodiment, in order to identify one point as the identification point included in the captured image, since the device such as the HMD 100 that detects the marker MK1 identifies the identification point by using a plurality of measured points which form the contour of the circle having the identification point as its center, it is possible to more accurately specify the identification point.

B. Second Embodiment

Figure 11:
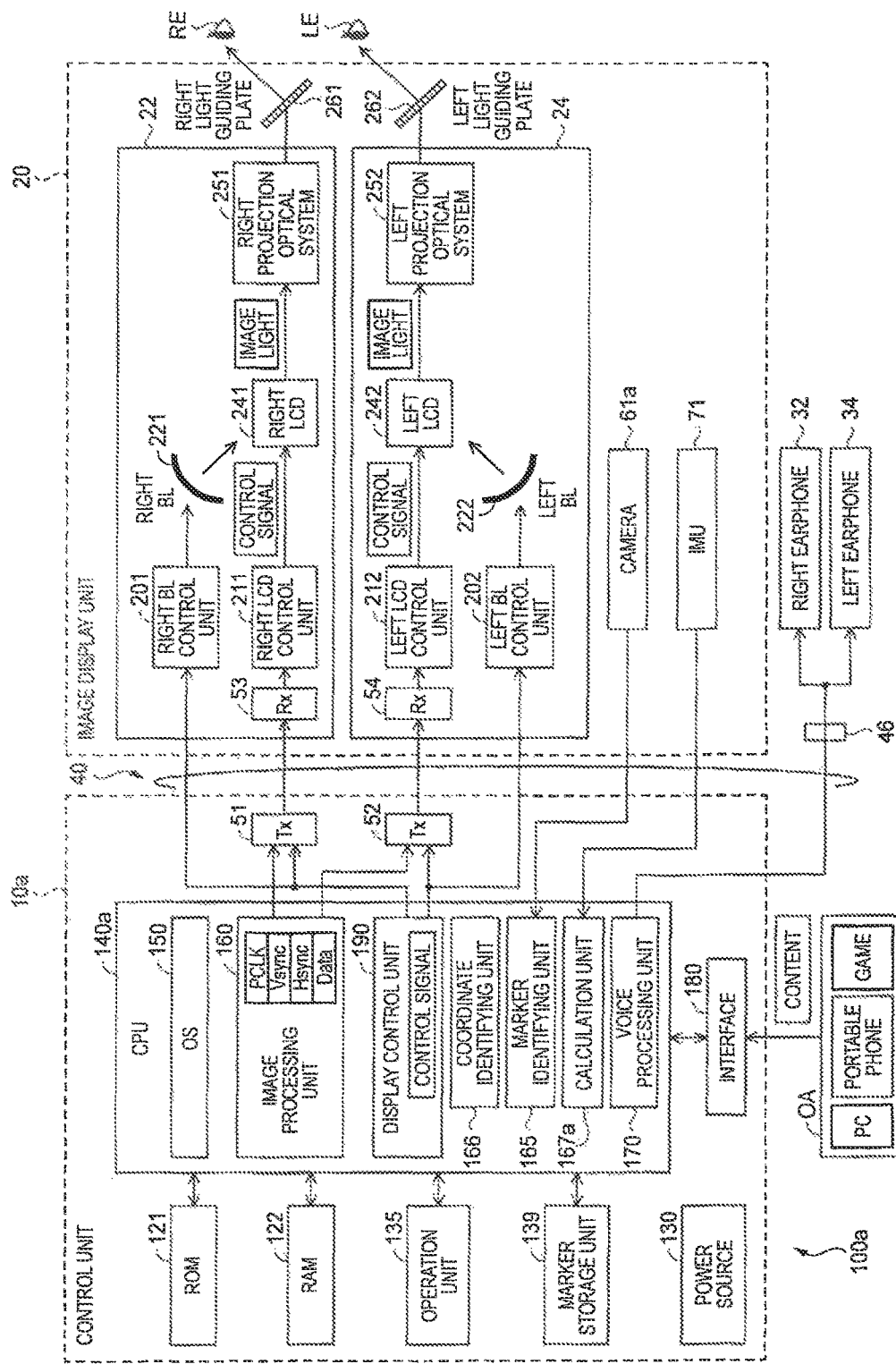
FIG. 11 is a block diagram that shows the functional configuration of the HMD

FIG. 11 is a block diagram showing functional elements of the HMD 100a according to the second embodiment. The HMD 100a of the second embodiment is basically the same as HMD 100 of the first embodiment except in that (1) the HMD 100a includes an IMU (inertial measurement unit) 71, (2) the HMD 100a derives a position and pose of the marker MK1 with respect to the global coordinate system in an initialization phase, using the "first pose" or the "second pose" of the marker MK1 derived in the first embodiment; (3) the HMD 100a derives a position and pose of the IMU 71 using a sensor fusion algorithm based on output from the camera 61a capturing image frames of the marker MK1 and output from the IMU 71, and (4) the HMD 100a derives a position and pose of the marker MK1 with respect to the camera 61a, using the thus derived position and pose of the IMU 71 and the position and pose of the marker MK1 with respect to the global coordinate system that is based on the above-mentioned "first pose" or the "second pose". Thus, in the second embodiment, the IMU 71 and the calculation unit 167*a* are described in details, but the other elements and processes that are similar to those in the first embodiment are not described in details.

As shown in FIG. 11, the image display section 20*a* includes an IMU 71. The IMU 71 includes an accelerometer and a gyro sensor as inertial sensors that detect the acceleration and angular velocity. The IMU 71 is mounted near the camera 61*a* in the HMD 100*a*. The IMU 71 also detects its direction based on the geomagnetism. Hereafter, the acceleration and angular velocity detected by the IMU 71 may also be referred to as the detection values of the IMU 71. The IMU 71 corresponds to an inertial sensor as described in the summary.

The camera 61*a* images a scene at the rate of 30 Hz. That is, the camera 61*a* acquires 30 image frames per second as a moving picture. The camera 61*a* may also be configured so as to be movable with respect to the image display section 20*a* in another embodiment.

The calculation unit 167*a* in the CPU 140*a* calculates a positional relationship between the sensor coordinate system of the IMU 71 with respect to the global coordinate system, which is the absolute coordinate system in the present embodiment, using the output of the IMU 71.

Figure 12:
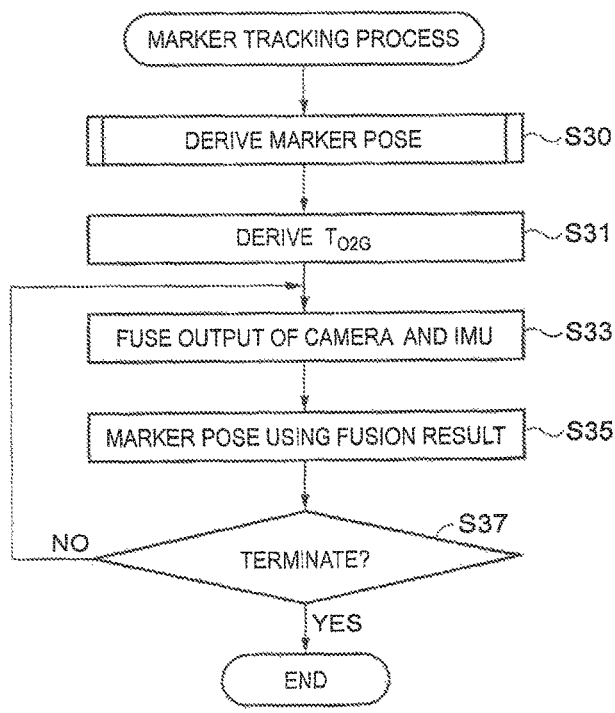
FIG. 12 is a flowchart of a marker tracking process of the second embodiment.

FIG. 12 is a flowchart showing a marker tracking process. In the marker tracking process, firstly, the CPU 140*a* conducts the pose estimation process (step S30) for the marker MK1 described in the first embodiment with reference to FIG. 4. Secondly, the CPU 140*a* calculate a transformation matrix $T_{O2G}$ representing a positional relationship between the object coordinate system, which is the coordinate system of the marker MK1, and the global coordinate system (step S31). The details of calculating the transformation matrix $T_{O2G}$ is described later. These steps S30 and S31 are also referred to as an initialization phase or process in the present embodiment.

Then, the calculation unit 167*a* derives a position and pose of the IMU 71 with respect to the global coordinate system, using a sensor fusion algorithm, based on output of the camera 61*a* capturing the image frames of the marker MK1 and output from the IMU 71 (step S33). As explained later, an algorithm based on the extended Kalman filter (EKF) is used as an example of the sensor fusion algorithm.

Figure 13:
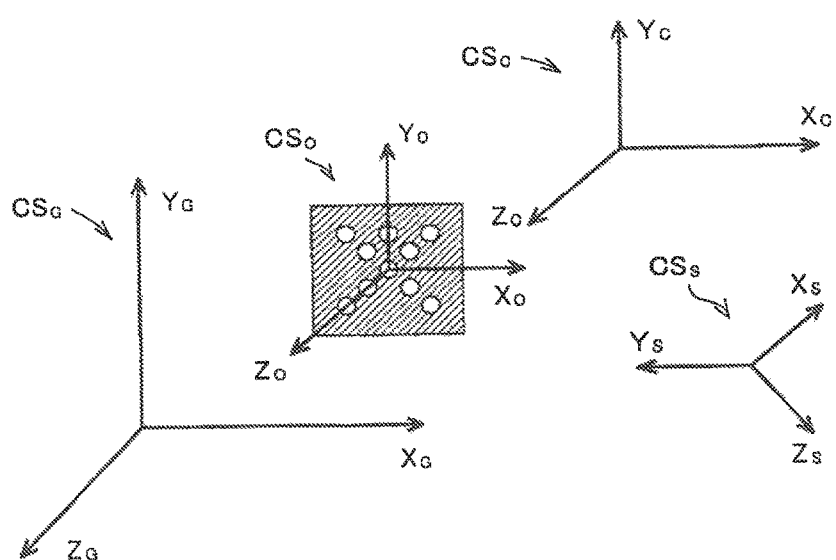
FIG. 13 is a schematic diagram showing relationships among coordinate systems involved in the second embodiment.

The fusion of output from the camera 61*a* and output from IMU 71 requires an accurate estimate of the camera position and pose with respect to the global coordinate system. FIG. 13 shows relationships among the three dimensional coordinate systems that are used in the fusion pipeline or process in the present embodiment. In FIG. 13, the object coordinate system $CS_O$ is attached to the marker MK1 as the object. In FIG. 13, the coordinate system $CS_C$, which is also called a camera frame of reference, is fixed the camera 61*a*. In FIG. 13, the coordinate system $CS_G$, which is also called the global frame of reference, is fixed to the earth with the x-axis pointing to local magnetic north and the z-axis pointing the opposite gravity direction. Also, in FIG. 13, the coordinate system $CS_S$, which is also called the sensor frame of reference, is fixed to the IMU 71.

The IMU 71 brings the pose of the IMU 71 with respect to the global coordinate system $CS_G$ and the calculation unit 167*a* outputs the marker pose with respect to the camera coordinate system $CS_C$ using the vision output from the camera 61*a*. To do the fusion of the vision and the IMU 71, it is necessary for them to be represented in the same coordinate system, and in the present embodiment the coordinate system $CS_G$ is used as a frame of reference common to them. In addition, the fusion result is the IMU pose in the global coordinate system $CS_G$, and it needs to be converted into the camera coordinate system $CS_C$ for rendering. To transform the position and pose of the IMU 71 to the position and pose of the object represented in the camera coordinate system $CS_C$, the following Expression (23) is utilized.

$$T_{O2C} = T_{S2C} * \text{Inverse}(T_{S2G}) * T_{O2G} \tag{23}$$

where the matrix $T_{S2C}$ is the transformation matrix between the sensor coordinate system $CS_S$ and the camera coordinate system $CS_C$, and is pre-known through a conventional IMU-camera calibration method. The matrix $T_{O2G}$ is the transformation matrix between the object coordinate system $CS_O$ and the global coordinate system $CS_G$. An assumption made here is that the marker MK1 is substantially static, so the matrix $T_{O2G}$ is fixed and needs to be calculated only once in the initialization phase (steps S30 and S31). The matrix $T_{S2G}$ is the position and pose of the IMU 71 in the global coordinate system $CS_G$. The matrix $T_{O2C}$ is the position and pose of the object, for example marker MK1, in the camera coordinate system $CS_C$.

In the second embodiment, the following method for the automatically calculating the matrix $T_{O2G}$ is employed. According to Expression (23) described above, following Expression (24) is derived while Expression (25) is used.

$$T_{O2G} = T_{S2G} * T_{C2S} * T_{O2C} \tag{24}$$

$$T_{C2S} = T_{S2C}^{-1} \tag{25}$$

In the initialization phase (steps S30 and S31), the user is asked through a predetermined user interface in the HMD 100*a* to keep his or her head substantially static for about 1 second while keeping the marker MK1 within the field of view of the camera 61*a*. In the case where the IMU 71 is substantially static, the matrix $T_{S2G}$ is calculated through Expression (26) to (33), where ax, ay and az are the readings or measurements from the accelerometer included in the IMU 71.

$$\tan(\text{roll}) = \tan\left(\frac{ay}{az}\right) \tag{26}$$

$$\tan(\text{pitch}) = \tan\left(\frac{-ax}{ay*\sin(\text{roll}) + az*\cos(\text{roll})}\right) \tag{27}$$

$$\text{yaw} = 0 \tag{28}$$

$$R_x(\text{roll}) = \begin{bmatrix} 1 & 0 & 0 \\ 0 & \cos(\text{roll}) & \sin(\text{roll}) \\ 0 & -\sin(\text{roll}) & \cos(\text{roll}) \end{bmatrix} \tag{29}$$

$$R_y(\text{pitch}) = \begin{bmatrix} \cos(\text{pitch}) & 0 & -\sin(\text{pitch}) \\ 0 & 1 & 0 \\ \sin(\text{pitch}) & 0 & \cos(\text{pitch}) \end{bmatrix} \tag{30}$$

$$R_z(\text{yaw}) = \begin{bmatrix} \cos(\text{yaw}) & \sin(\text{yaw}) & 0 \\ -\sin(\text{yaw}) & \cos(\text{yaw}) & 0 \\ 0 & 0 & 1 \end{bmatrix} \tag{31}$$

$$R_{S2G} = (R_x * R_y * R_z) \tag{32}$$

$$T_{S2G} = \begin{bmatrix} R_{S2G} & 0_2 \\ 0 & 0 & 0 & 1 \end{bmatrix} \tag{33}$$

In Expressions (26) to (31), roll, pitch and yaw represent rotation angles around $X_G$, $Y_G$ and $Z_G$ axes, respectively, in the global coordinate system $CS_G$, and yaw, which represents the rotation angle around the axis $Z_G$ parallel to gravity direction, is set to zero as shown in Expression (28) in the initialization phase. As shown in Expression (33), the thus obtained matrix $T_{S2G}$, which is used in the initialization phase, is a 4 by 4 matrix.

The matrix $T_{O2C}$ represents the position and pose of the marker MK1 in the camera coordinate system $CS_C$, and is derived at step 30 in FIG. 12 through the method described in the first embodiment. Once the calculation unit 167a has derived the matrices $T_{S2G}$ and $T_{O2C}$, the calculation unit 167a derives the matrix $T_{O2G}$ at step 31 in FIG. 12 according to Expression (24), based on the matrices $T_{S2G}$ and $T_{O2C}$.

If the calculation unit 167a has finished the initialization phase or process (steps S30 and S31), the positions of feature elements on the marker MK1 is detected in the image frames. Specifically, in the present embodiment, the coordinate-identification unit 166 identifies and outputs the image coordinates of the 9 circle centers on the marker MK1. The marker pose (meaning its position and pose) calculation is not necessarily needed in the present embodiment.

The calculation unit 167a implements an Extended Kalman Filter (EKF) so as to estimate or derive the position and pose of the IMU 71 based on output from the camera 61a, which includes the image coordinates of the circle centers, and output from the IMU 71 (step S33). Two EKFs are available: one is DLT-based EKF and the other is Error-driven EKF. In the present embodiment, the calculation unit 167a is configured to implement Error-driven EKF at steps S33 in FIG. 12 as a part of the pipeline or process in step S33 as described below.

The state $x_k$ and observation $z_k$ are respectively represented as follows:

$$x_k = f(x_{k-1}, u_{k-1}, w_{k-1}) \tag{34}$$

$$z_k = h(x_k, v_k) \tag{35}$$

In Expressions (34) and (35), $w_k$ and $v_k$ are the process and observation noises which are both assumed to be zero mean multivariate Gaussian noises with covariance $Q_k$ and $R_k$ respectively.

The state forecast and state prediction are respectively represented by Expressions (36) and (37) below.

$$\hat{x}_{k|k-1} = f(\hat{x}_{k-1|k-1}, u_k, w_k) \tag{36}$$

$$P_{k|k-1} = F_{k-1} P_{k-1|k-1} F_{k-1}^T + L_{k-1} Q_{k-1} L_{k-1}^T \tag{37}$$

The state update is given by Expression (42) with Expressions from (38) to (41) if the marker MK1 is detected in the image frames from the camera 61a:

$$\tilde{y}_k = z_k - h(\hat{x}_{k|k-1}) \tag{38}$$

$$S_k = H_k P_{k|k-1} H_k^T + M_k R_k M_k^T \tag{39}$$

$$K_k = P_{k|k-1} H_k^T S_k^{-1} \tag{40}$$

$$P_{k|k} = (I - K_k H_k) P_{k|k-1} \tag{41}$$

$$\hat{x}_{k|k} = \hat{x}_{k|k-1} + K_k \tilde{y}_k \tag{42}$$

For calculation of $F_k$, $L_k$, $M_k$, and $R_k$ in the above Expressions, conventional techniques are available.

At step S33, the state vector $x_k = \{b_k, b_k', q_k\}$ which includes the IMU position $b_k$, IMU velocity $b_k'$ and IMU orientation $q_k$, all in the global coordinate system $CS_G$. $u_k$ is the control input which includes input from the accelerometer and the gyro sensor included in the IMU 71. In another embodiment, input from magnetic sensor may also be included in the control input. The observation $z_k$ includes the image coordinates of all the feature points (9 circle centers) of the marker MK1.

When marker MK1 is detected in the image frames from the camera 61a, the state vector $X_k$ is updated by Expression (42). When marker is not detected, the state vector $x_k$ is updated (predicted) by Expression (36).

$X_k$ contains the latest position and pose of the IMU 71 while the HMD 100a needs the position and pose of the marker MK1, for example, in the camera coordinate system $CS_c$ (also referred to as a marker pose) for rendering by CPU 110a.

The position and pose of the marker MK1 is calculated from the position and pose of the IMU 71 (also referred to as an IMU pose) with Expression (23) at step S35 by the calculation unit 167a. Whether the marker MK1 is detected or not, the marker pose will be updated according to the IMU pose at the IMU frequency of 125 Hz according to the present embodiment.

Figure 14:
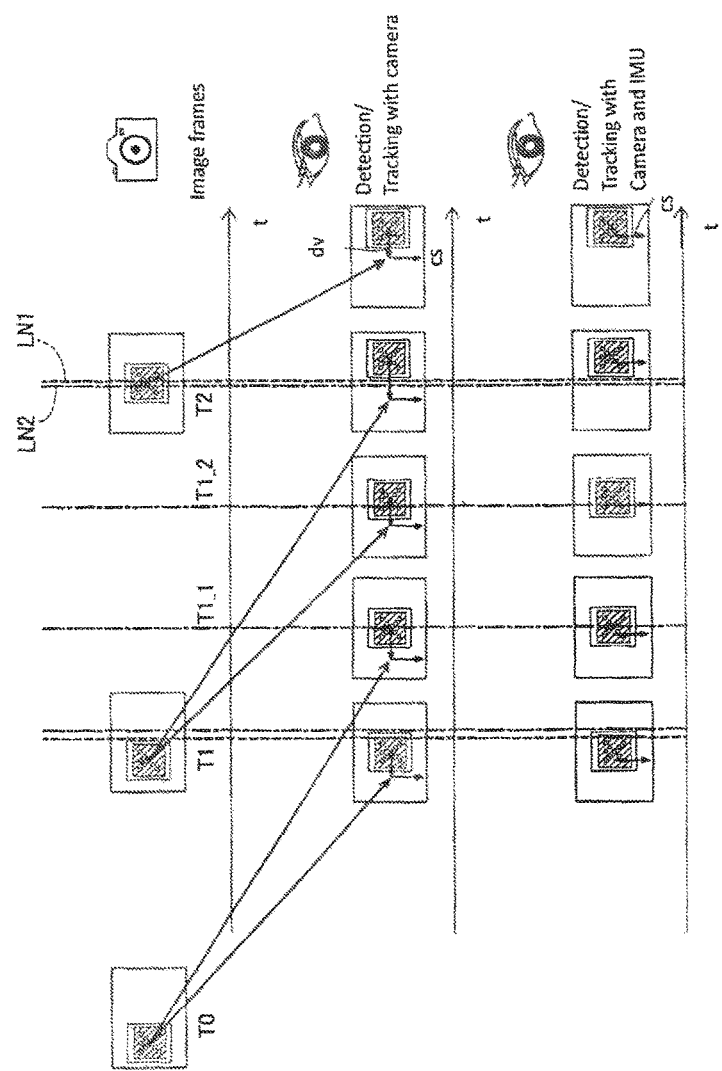
FIG. 14 is a schematic timing chart showing an advantage of marker tracking with fusion of the camera and the IMU.

FIG. 14 illustrates how the tracked marker pose (the position and pose) is updated with/without the IMU 71. In FIG. 14, the horizontal axis represents time. Also, in FIG. 14, the upper row indicates time points at which capturing image frames by the camera 61a occurs, the middle row indicates the marker pose tracked with the camera 61a but without the IMU 71, and the lower row indicates the marker pose tracked with the camera 61a and the IMU 71 according to the present embodiment. The arrow cs indicates the x coordinate of the center of the tracked marker MK1 in the image frames, and the bidirectional arrow dv indicates the distance between the real center of marker MK1, which the user visually perceives over the image display section 20, and the tracked center of marker MK1, which is displayed on the image display unit 20. Capturing the image frames by the camera 61a occurs at a frequency of 30 Hz, and is represented with $T_n$. The detection by the IMU 71 occurs at a frequency of 125 Hz, and is indicated with $T_{n\_m}$. As seen from FIG. 14, tracking the marker MK1 with the camera 61a and the IMU 71 reduces latency observed in tracking compared to tracking the marker MK1 without the IMU 71.

When the marker MK1 is tracked with the camera 61a but without the IMU 71, tracking is stable if the marker MK1 of reasonable size is used; however, when the marker MK1 becomes smaller in size or the distance between the camera 61a and the marker MK1 increases, more jittering may be observed in tracking. Contrary to this, when the marker MK1 is tracked with the camera 61a and the IMU 71, no significant increase in jittering is observed and thus tracking remains stable even when a smaller marker MK1 is used and/or the distance between the camera 61a and the marker MK1 has increased.

If the calculation unit 167a has implemented the process of step S35 in FIG. 12, the CPU 140a determines whether to terminate tracking the position and pose of the marker MK1 (step S37). In the case where the operation unit 135 receives a predetermined operation to terminate tracking from the user (step S37: YES), the CPU 140a terminate tracking the position and pose of the marker MK1. In the process of step S37, in the case where the operation unit 135 does not receive the predetermined operation to terminate tracking the position and pose (step S37: NO), the CPU 140a repeats the processes of steps S33 and S35.

As explained above, in the HMD 100a according to the second embodiment, the calculation unit 167a derives the relative positional relationship between the camera 61a and the marker MK1 using the output of the camera 61a and the IMU 71 after the initialization phase or process in which the relative positional relationship between the camera 61a and the marker MK1 derived in the first embodiment is used. As a result, latency observed in tracking is reduced compared to tracking the marker MK1 without the IMU 71. Furthermore, no significant increase in jittering is observed and thus tracking remains stable even when a smaller marker MK1 is used and/or the distance between the camera 61a and the marker MK1 has increased. The initialization phase (steps S30 and S31 in FIG. 12) of the second embodiment makes the use of the fusion of the camera 61a and the IMU 71 easier, since the user wearing the HMD 100a is required only to cause the marker MK1 to be within the field of view of the camera 61a and then keep his/her head substantially static for preferably about 1 second so as to start tracking the position and pose of the marker MK1 with the camera 61a and the IMU 71.

C. Modification Example

Although the invention is not limited to the aforementioned embodiment, various forms are embodied without departing from the gist, and for example, the following modifications are possible.

C-1. Modification Example 1

In the marker MK1 of the aforementioned embodiment, the plurality of circles included in the square shape has the same size. However, the circles included in the marker may have different sizes, or may be a semi-circle shape or a triangle shape which is a shape other than the circle. For example, the circles included in the first circle group CG1 and the second circle group CG2 may have different sizes. When an equilateral triangle is used in place of the circle, the center of the equilateral triangle may be used as an identification point for identifying the marker MK1.

In the marker MK1 of the aforementioned embodiment, the circle C3 having the intersection of the two diagonals CL1 and CL2 as its center is formed. However, the circle having the intersection of the diagonals as its center is not be necessarily formed. Although it has been described that the number of circles included in the first circle group CG1 and the number of circles included in the second circle group CG2 are an odd number, the number of circles may be an even number. Alternatively, the number of circles included in any one of the first circle group and the second circle group may be an odd number, and the number of circles included in the other one of them may be an even number. Although it has been described that the first circle group CG1 and the second circle group CG2 have point symmetry using the center C3P of the circle C3 as its center and have point line symmetry using one side of four sides passing the center C3P as is center, the first circle group and the second circle group does not necessarily have point symmetry, or does not necessarily have line symmetry. Although it has been described that the distances between the centers of the adjacent circles constituting the first circle group CG1 and the second circle group CG2 are equal, the distances may be different. For example, any distance relationship between only certain circles included in the first circle group CG1 may be established.

In the marker MK1 of the aforementioned embodiment, the direction-identification circle C10 includes one circle, but may include a plurality of circles or may have a shape other than the circle shape.

C-2. Modification Example 2

In the method of detecting the marker MK1 of the aforementioned embodiment, the marker identifying unit 165 extracts the marker MK1 from the captured image by performing the binarization on the gradation values of the pixels of the captured image obtained by the camera 61, but may extract the marker MK1 from the captured image by performing multi-valued quantization by using a value greater than 2. When it is not able to extract the marker MK1 on one captured image on which the binarization has been performed using the initial threshold, the marker identifying unit 165 performs the binarization on the captured image by using the new gradation value obtained by adding the gradation value as the addition amount to the initial threshold, as the new gradation value. However, it is not necessary to perform the binarization by setting the plurality of gradation values as the threshold. The marker identifying unit 165 may determine to extract the marker MK1 by performing the binarization on the captured image by using only the threshold which is one preset gradation value. The marker identifying unit 165 uses the gradation value of the initial threshold as the gradation value for determining whether or not to continue the addition of the addition amount to the threshold, but may use other gradation values. For example, when the new threshold exceeds to the upper limit of the gradation value, the marker identifying unit 165 may stop the process of adding the gradation value of the addition amount to the gradation value of the new threshold.

C-3. Modification Example 3

When it is not necessary to obtain the direction or orientation of one of the coordinate axes, based on which the pose (rotations) of the marker MK1 with respect to the camera 61 is defined, an orientation identification circle C10 may be omitted from the marker MK1 of the present embodiment. In this case, it is possible to obtain the translation relationship with high accuracy while suppressing the possibility of misdetection of the marker by the first circle group CG1 and the second circle group CG2.

C-4. Modification Example 4

The marker MK1 may be attached onto the surface of the controller 10. The marker MK1 may be provided to the portable terminal in the form of computer program or data so as to be displayed on the display unit of the portable terminal such as a smartphone including the display unit.

The invention is not limited to the aforementioned embodiments or modification examples, but may be implemented as various configurations without departing from the gist. For example, the technical features of the embodiments and modification examples corresponding to the technical features of the aspects described in the SUMMARY may be appropriately substituted or combined in order to solve a part or all of the aforementioned problems or in order to achieve a part or all of the aforementioned advantages. When it has been described in the present specifications that the technical features are not essential, the technical features may be appropriately removed.

C-5. Modification Example 5

Although it has been described in the aforementioned embodiments that the HMD 100 is used as the device for superimposing the display image on the external scenery, a different device may be used as the device including the image display unit 20 and the camera 61 as the capturing unit. For example, the devices including the capturing unit, the image display unit and the calculation unit 167 may be respectively different devices. In this case, the calculation unit 167 may calculate the relative positional relationship described in the aforementioned embodiments by using the captured image obtained by another device by performing the transmission and reception of data through wireless communication such as LAN, and a device different from the device including the calculation unit 167 may display the image using the calculated relative positional relationship.

What is claimed is:

1. A method of detecting a marker, the method comprising:
    capturing external scenery with a camera; and
    by way of one or more processors:
        extracting the marker from an image of the captured external scenery, the marker comprising quadrilateral specifying elements that specify a quadrilateral shape;
        identifying, from the extracted marker, first and second identification elements that identify the marker, the first and second identification elements being within the quadrilateral shape, the first identification elements being present in a line of a first diagonal which is one of two diagonals of the specified quadrilateral shape, and the second identification elements being present in a line of a second diagonal which is the other diagonal of the two diagonals than the first diagonal;
        identifying a direction-identification element of the marker that identifies a direction of the extracted marker, the direction-identification element being other than the first and second identification elements, and a center of the direction-identification element overlapping neither of the first and second diagonals; and
        calculating position and pose of the marker with respect to the camera based on the identified direction-identification element of the marker and the plurality of first and second identified identification elements,
    wherein the direction-identification element is located in one of four triangles defined by the quadrilateral specifying elements and an intersection of the first and second diagonals, no other direction-identification element is located on the other three triangles.

2. The method according to claim 1,
    wherein in the extracting of the marker, the identifying of the direction-identification element, and the identifying of the identification elements, binarization is performed on the image of the captured external scenery by using an adaptive thresholding method.

3. The method according to claim 1,
    wherein the direction-identification element and the identification elements are identified using the center of the direction-identification element and centers of the identification elements.

4. The method according to claim 1,
    wherein the marker further comprises a central identification element having a center at the intersection of the two diagonals.

5. The method according to claim 4,
    wherein the central identification element is included in the first identification elements and in the second identification elements.

6. The method according to claim 1,
    wherein the direction-identification element is separate from the intersection of the two diagonals and is a central element of a direction-identification circle within the quadrilateral shape.

7. The method according to claim 6,
    wherein the direction-identification circle is different from a central element having a center at the intersection of the two diagonals, the direction-identification circle not being included in the first identification elements and the second identification elements.

8. The method according to claim 6,
    wherein the direction-identification element is one circle.

9. The method according to claim 1,
    wherein the first identification elements and the second identification elements are formed so as to have at least one of (i) line symmetry with respect to a straight line which passes through the center of the quadrilateral shape and is parallel to one side of the quadrilateral shape and (ii) point symmetry with respect to the intersection of the two diagonals.

10. The method according to claim 1,
    wherein sizes of the identification elements within the quadrilateral shape are all the same.

11. The method according to claim 1,
    wherein the identification elements within the quadrilateral shape have in common a white color or a black color, and
    the quadrilateral specifying elements are four vertices at which outer frames of the quadrilateral shape come to contact each other, and portions other than the identification elements within the quadrilateral shape have in common a white color or a black color different from the color of the identification elements.

12. The method according to claim 1,
    wherein the first identification elements form a first identification element group, the first identification elements being arranged with the intersection of the two diagonals as a center of the first identification element group, each distance between adjacent centers of the first identification elements having the same first distance among the first identification elements, each first identification element having the same first size among the first identification elements, and
    the second identification elements form a second identification element group, the second identification elements being arranged with the intersection of the two diagonals as a center of the second identification element group, each distance between adjacent centers of the second identification elements being the same as the first distance, each second identification element having the same size as the first size.

13. A non-transitory computer-readable medium storing a computer program that causes a computer comprising one or more processors and being capable of communicating with a device including a camera to detect a marker, the computer program causing the computer to realize functions of:
    capturing external scenery with the camera;
    extracting the marker from an image of the captured external scenery, the marker comprising quadrilateral specifying elements that specify a quadrilateral shape;
    identifying, from the extracted marker, first and second identification elements that identify the marker, the first and second identification elements being within the quadrilateral shape, the first identification elements being present in a line of a first diagonal which is one of two diagonals of the specified quadrilateral shape, and the second identification elements being present in a line of a second diagonal which is the other diagonal of the two diagonals than the first diagonal;

identifying a direction-identification element of the marker that identifies a direction of the extracted marker, the direction-identification element being other than the first and second identification elements, and a center of the direction-identification element overlapping neither of the first and second diagonals; and first calculating position and pose of the marker with respect to the camera based on the identified direction-identification element of the marker and the plurality of first and second identified identification elements, wherein the direction-identification element is located in one of four triangles defined by the quadrilateral specifying elements and an intersection of the first and second diagonals, no other direction-identification element is located on the other three triangles.

14. The non-transitory computer-readable medium according to claim 13, wherein the computer program causes the computer to realize functions of:

further capturing the marker with the camera;

calculating a position and pose of an inertial sensor of the device using a sensor fusion algorithm based on output from the camera obtained through the further capturing and output from the inertial sensor; and second calculating position and pose of the marker based at least on (i) the position and pose of the marker calculated through the first calculating and (ii) the calculated position and pose of the inertial sensor.

* * * * *